(12) United States Patent
Fritz et al.

(10) Patent No.: US 8,566,509 B2
(45) Date of Patent: Oct. 22, 2013

(54) EFFICIENTLY IMPLEMENTING A PLURALITY OF FINITE STATE MACHINES

(75) Inventors: Rolf K. Fritz, Boeblingen (DE);
Andreas Muller, Zurich (CH); Thomas Schlipf, Boeblingen (DE); Daniel Thiele, Schladen (DE)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 12/546,772

(22) Filed: Aug. 25, 2009

(65) Prior Publication Data

US 2011/0055510 A1    Mar. 3, 2011

(51) Int. Cl.
*G06F 12/00*    (2006.01)
*G06F 13/00*    (2006.01)

(52) U.S. Cl.
USPC ............................... 711/103; 711/6; 711/203

(58) Field of Classification Search
None
See application file for complete search history.

(56) References Cited

U.S. PATENT DOCUMENTS

| 6,553,531 B1 | 4/2003 | Kim et al. |
| 2005/0204058 A1 | 9/2005 | Philbrick et al. |
| 2011/0055842 A1 | 3/2011 | Fritz et al. |

OTHER PUBLICATIONS

Notice of Allowance (Mail Date Nov. 1, 2012) for U.S. Appl. No. 12/546,852, filed Aug. 25, 2009.
U.S. Appl. No. 12/546,852, filed Aug. 25, 2009.

*Primary Examiner* — Scott Sun
(74) *Attorney, Agent, or Firm* — Schmeiser, Olsen & Watts; Thomas Tyson

(57) ABSTRACT

A method and program product for processing data by a pipeline of a single hardware-implemented virtual multiple instance finite state machine (VMI FSM). An input token of multiple input tokens is selected to enter a pipeline of the VMI FSM. The input token includes a reference to an FSM instance. In one embodiment, the reference is an InfiniBand QP number. After being received at the pipeline, a current state and context of the FSM instance are fetched from an array based on the reference and inserted into a field of the input token. A new state of the FSM instance is determined and an output token is generated. The new state and the output token are based on the current state, context, a first input value, and an availability of a resource. The new state of the first FSM instance is written to the array.

20 Claims, 13 Drawing Sheets

EFFICIENTLY IMPLEMENTING A PLURALITY OF FINITE STATE MACHINES

FIELD OF THE INVENTION

The present invention relates to a data processing method and system for implementing multiple logical finite state machines using a single hardware finite state machine implementation, and more particularly to using a pipelined virtual multiple instance finite state machine to process data.

BACKGROUND OF THE INVENTION

In modern network protocols, multiple transfers are active at a given point in time. These transfers need to be controlled by finite state machines (FSMs) on both the send side and the receive side in order to fulfill and check the overall protocol, process gather/scatter lists, resolve resource conflicts, etc. Known solutions employ a limited number of separate units that control an aspect of the protocol for some time (e.g., send process) and a dispatcher that assigns work to the separate units, thereby creating a significant amount of communication and mux/de-mux overhead. Furthermore, these known solutions do not scale well. Thus, there exists a need to overcome at least one of the preceding deficiencies and limitations of the related art.

SUMMARY OF THE INVENTION

In first embodiments, the present invention provides a computer-implemented method of processing data by a pipeline of a virtual multiple instance finite state machine (VMI FSM). A plurality of input tokens referencing a plurality of FSM instances included in the VMI FSM is received. The VMI FSM is a single hardware implementation. A first input token of the plurality of input tokens is selected to enter the pipeline of the VMI FSM. The first input token includes a first field that includes a reference to a first set of one or more FSM instances (a.k.a. first FSM instance) of the plurality of FSM instances and a second field that includes a first input value. The first input token is received at the pipeline of the VMI FSM. A current state of the first FSM instance and a context of the first FSM instance are fetched from an array based on the reference included in the first field of the first input token. The current state of the first FSM instance and the context of the first FSM instance are inserted into one or more other fields of the first input token. The VMI FSM switches to the first FSM instance of the plurality of FSM instances included in the VMI FSM by receiving the first input token including the current state of the first FSM instance and the context of the first FSM instance inserted into the one or more other fields of the first input token. A new state of the first FSM instance is determined based on the current state of the first FSM instance, the context of the first FSM instance, the first input value, and a status of an environment. A first output token is generated, where the first output token is based on the current state of the first FSM instance, the context of the first FSM instance, the first input value, and the status of the environment. The new state and context of the first FSM instance is written to the array. After the pipeline of the VMI FSM receives the first input token and prior to determining the new state and prior to determining the first output token, a second input token of the plurality of input tokens is selected to enter the pipeline of the VMI FSM. The second input token includes a first field that includes a reference to a second set of one or more FSM instances (a.k.a. second FSM instance) of the plurality of FSM instances and a second field that includes a second input value.

A system, computer program product, and process for supporting computing infrastructure corresponding to the above-summarized methods are also described and claimed herein.

One or more embodiments of the present invention provide a technique for implementing multiple logical FSMs simultaneously using a single hardware FSM implementation. In one embodiment, the present invention implements the processing of an input/output (I/O) protocol on an adapter (e.g., on an I/O chip), where the I/O protocol is characterized by dedicated wait queues for different types of protocol packets. The serializing nature of embodiments of the present invention decreases complexity. Further, one or more embodiments of the present invention allow for an advantageous separation of the application layer and infrastructure layer, which increases portability and enables reuse. Still further, the pipelined aspect of one or more embodiments of the present invention facilitates the application of speed-up techniques (e.g., pre-decode) and is well-suited for high speed/low latency implementations. Moreover, multiple apparatuses implementing the present invention may interact via tokens and form larger structures to cope with problems of high complexity.

DETAILED DESCRIPTION OF THE INVENTION

Overview

One or more embodiments of the present invention provide a pipelined virtual multiple instance finite state machine (VMI FSM). A VMI FSM is single hardware FSM (i.e., physical FSM) implementation that implements multiple logical FSMs (a.k.a. FSM instances) simultaneously. The single hardware FSM implementation switches between the different logical FSMs by using different subsets of an array, where the subsets of the array are associated with the logical FSMs in a one-to-one correspondence. The subset of the array associated with a particular logical FSM specifies the current state and context (e.g., transport mode, expected packet sequence number, etc.) of the associated logical FSM. The logical FSMs communicate with external entities via tokens. The logical FSMs communicate among themselves via support functions. Two variants of the VMI FSM include pipelined processing with guards and pipelined processing without guards and feedback. The present invention includes the pipelined processing to provide efficiency. The physical FSM can use only one subset of the array at a time (i.e., during a clock cycle for the FSM hardware implementation), thereby performing the state transition of the particular logical FSM associated with the subset of the array. One embodiment of the present invention uses guards to avoid array read/write conflicts (e.g., a conflict arising from two tokens for the same FSM being back-to-back in the pipeline, whereby the later token does not see the result of the prior token). Another embodiment uses a forwarding technique to avoid array read/write conflicts.

System for Implementing Virtual Multiple Instance FSMs

Figure 1:
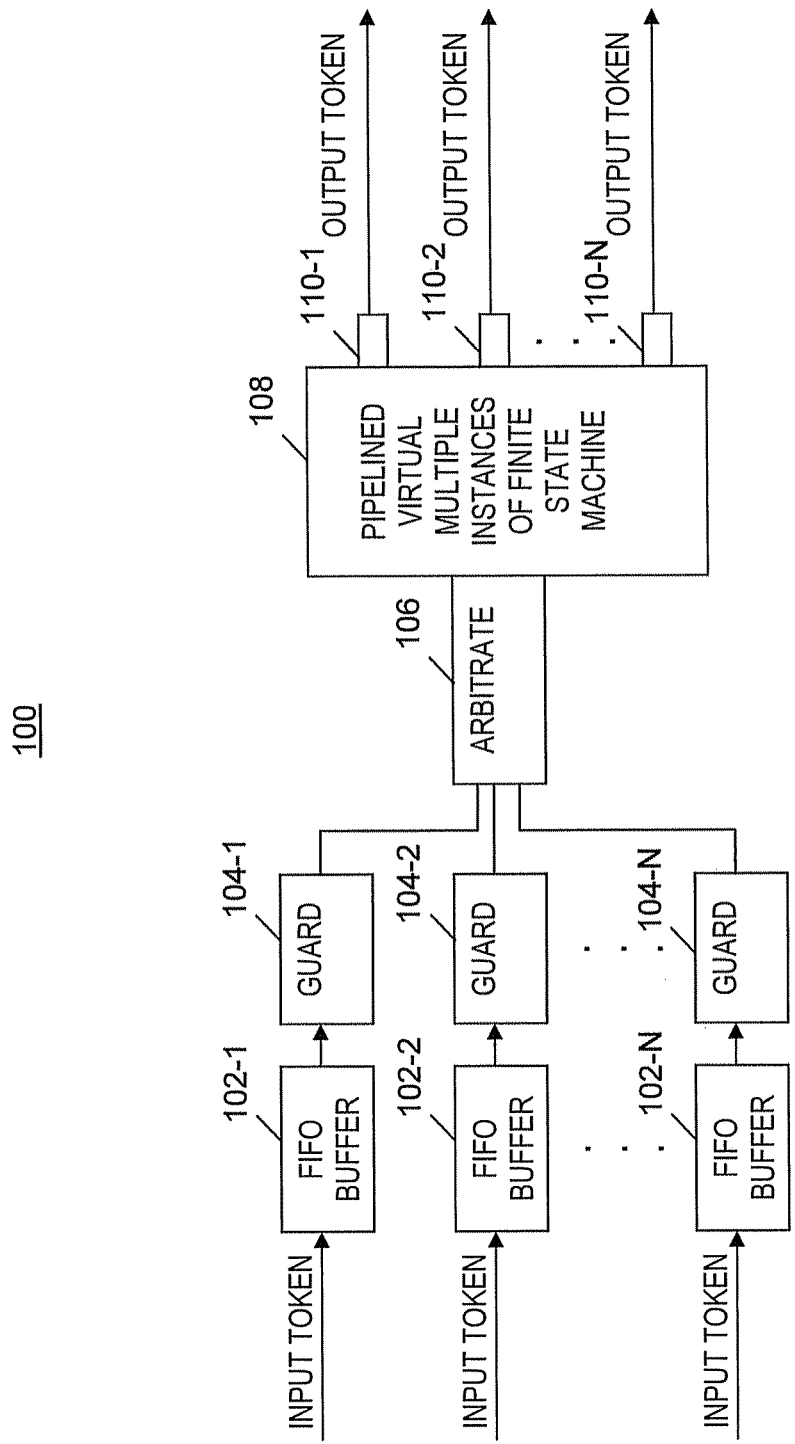
FIG. 1 is a block diagram of a system for implementing multiple logical finite state machines using a single hardware finite state machine implementation, in accordance with embodiments of the present invention.

FIG. 1 is a block diagram of a system for implementing multiple logical finite state machines using a single hardware finite state machine implementation, in accordance with embodiments of the present invention. System 100 includes an optional plurality of first-in-first-out (FIFO) buffers 102-1, 102-2, . . . , 102-N, an optional plurality of guards 104-1, 104-2, . . . , 104-N, an arbitrate component 106, a pipelined VMI FSM 108, and a plurality of output registers 110-1, 110-2, . . . 110-N. In one embodiment, FIFO buffers 102-1, 102-2, . . . , 102-N, guards 104-1, 104-2, . . . , 104-N, arbitrate component 106, and VMI FSM 108 are implemented as hardware components of one or more electronic circuits. In one embodiment, VMI FSM 108 is implemented as logic circuitry (i.e., one or more logic circuits) comprising multiple electrically conductive elements that provide one or more blocks of combinational logic that perform operations included in the process of FIG. 3, FIG. 5A or FIG. 5B, or a combination thereof. For example, VMI FSM 108 is logic circuitry included in a digital I/O chip.

Initiatives (e.g., for initiating I/O events) are received by system 100 via input tokens. Each input token received by system 100 carries a field that specifies as a target a particular FSM instance of the multiple FSM instances of VMI FSM 108 or a particular set of FSM instances included in the multiple FSM instances of VMI FSM 108.

For example, in the case of the VMI FSM 108 being used to implement an InfiniBand adapter, the field in the input token is a Queue Pair Number (i.e., QP number), which identifies a primary element of the Infiniband architecture. In the InfiniBand architecture, communication occurs between queue pairs, instead of between ports. A queue pair in the Infiniband architecture is an addressable entity that consists of two work queues: a Send work queue and a Receive work queue.

In cases, where a natural identifier such as a QP number is either not available or does not make sense and the task to get executed ends stateless, then a unit, that manages slot-IDs and such VMI-FSMs may be added prior to the FIFO Buffer, that receives the input token, which initiates the task. If such an input token arrives it will get a slot-ID assigned out of a list of free slot-IDs. This slot-ID is then removed from the list of free slot-IDs. Once the total task ends, in this case stateless then the slot-ID is added to the list of free slot-IDs again. Adding the slot ID to the list of free slot-IDs may be initiated by the VMI FSM instance itself when returning back to its idle state at the end of the total task, where in this case neither state nor environment information needs to be kept and the VMI FSM instance is free to start a new task.

Each input token received by system 100 may also include a type field that identifies the type of the input token (e.g., packet header token or mode change token) and additional fields that carry all necessary input information for the targeted FSM instance (e.g., packet header of the received data packet, a memory-mapped I/O (MMIO) trigger command, etc.).

In one embodiment, each input token enters system 100 via a FIFO buffer (e.g., FIFO buffer 102-1) and requests processing. The FIFO buffer provides an increase in efficiency and communication speed with other units. Each request for processing may be filtered by a guard (e.g., guard 104-1), which is a hardware component that solves read/write conflicts related to the pipeline. Only one request per target FSM instance (or set of FSM instances) is in the pipeline at any given point in time. That is, the pipeline never includes the same Port identifier in more than one of the stages of the pipeline. The Port identifier and the stages of the pipeline are described below relative to FIG. 2. After multiple input tokens are received optionally via the FIFO buffers and optionally via the guards, the arbitrate component 106 multiplexes the data streams that include the input tokens, thereby selecting a single input token for processing by the pipelined VMI FSM 108. After processing by VMI FSM 108, output tokens are generated and are outputted via registers 110-1, 110-2, . . . , 110-N.

Again, in an alternate embodiment, the read/write conflicts may be resolved by the aforementioned forwarding approach instead of by the optional guards. For example, instead of reading from the array, the pipeline stage that has the most current value is determined, and that most current value is used to avoid the conflict.

Figure 2:
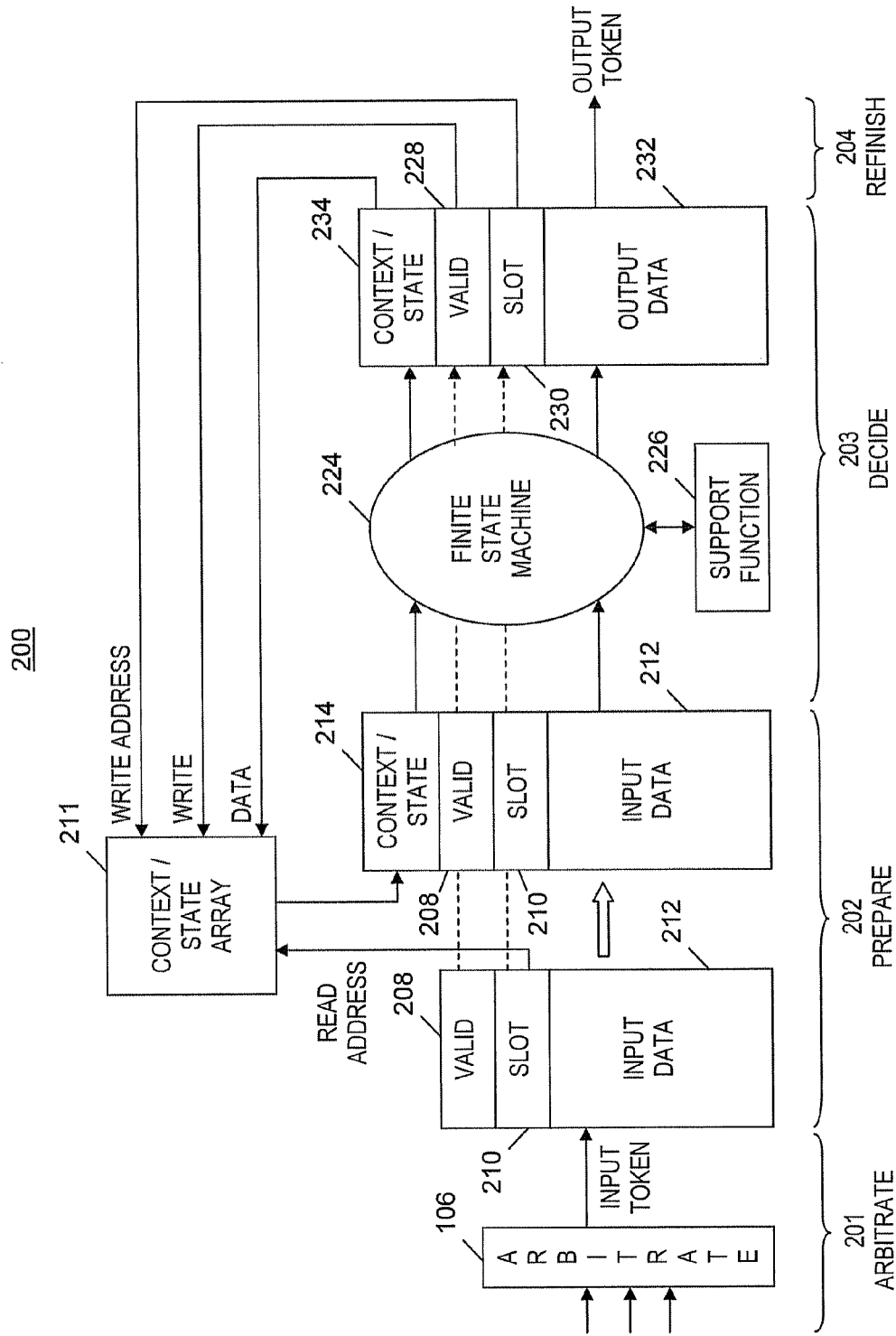
FIG. 2 is a block diagram of a pipeline of the multiple logical finite state machines implemented by the system of FIG. 1, in accordance with embodiments of the present invention.

FIG. 2 is a block diagram of a pipeline of the multiple logical finite state machines implemented by the system of FIG. 1, in accordance with embodiments of the present invention. System 200 includes the following four stages for processing input tokens by VMI FSM 108 (see FIG. 1): arbitrate stage 201, prepare stage 202 (a.k.a. preparation stage), decide stage 203 (a.k.a. decision stage), and refinish stage 204.

In arbitrate stage 201, arbitrate component 106 receives multiple input tokens and selects and muxes an input token to be processed in prepare stage 202.

The input token selected in the arbitrate stage 201 is formed by the triple of fields: {valid 208, slot 210, input-data 212}. The valid field 208 is a Boolean flag that travels through the pipeline. The Boolean flag in valid field 208 has a value of true in response to arbitrate component 106 placing an input token into the pipeline. In a particular cycle, if arbitrate component 106 has no token available for a stage, and the pipeline needs to be clocked because other input tokens are in the pipeline, then the arbitrate component asserts the value of the valid field 208 as false, thereby disabling all the activity in the stage.

The selected input token also includes slot field 210 that includes a value that determines a slot (i.e., a part) of a context/state array 211, where the slot references a particular FSM instance of the multiple FSM instances of VMI FSM 108 (see FIG. 1). As used herein, an array such as array 211 is defined as an addressable block of memory. During the preparation stage, the value in slot field 210 is read and used to look up and retrieve a context and state (i.e., context/state 214) of the FSM instance from context/state array 211 (also referred to herein as state array 211), where the context/state array 211 associates the value included in slot field 210 with the context and state of the FSM instance. The context of an FSM instance includes additional data that needs to be stored, besides the state of the FSM instance. For example, the context may include a type of header that is to be expected and a header sequence number. In one embodiment, the value in slot field 210 is a Port identifier (i.e., Port_ID), which is a number used to reference a corresponding context and state included in the context/state array 211 and to select an output register that is to be loaded with an output vector generated by the logic of FSM 224. The Port_ID may be generated by a scheduler (not shown) or by arbitrate component 106.

The input-data field 212 includes one or more application-dependent input values. In the case of the input tokens being received from multiple sources, a hierarchical structure of data fields may be utilized so that input token={valid, slot, input-data} and input-data={type, input-data-fields}, where type determines the layout and how to interpret other input data included in input-data-fields.

For example, if an InfiniBand packet is received, then the header of the InfiniBand packet is included in an input token that enters via, for example, FIFO buffer 102-1 (see FIG. 1). In this example, the input token includes a type=header so that the stages after the arbitrate stage would know that the input-data-fields include a packet sequence number and other well-defined fields of an InfiniBand packet header. MMIOs, for example, may enter via FIFO 102-2 (see FIG. 1) and include a type=MMIO and input-data-fields that include MMIO-address and MMIO-data, thereby updating the context and state of VMI FSM 108 (see FIG. 1) such that the mode of operations of the particular VMI FSM changes. Using the present invention to process InfiniBand packets is described in more detail below.

The retrieved context/state 214 is added to one or more fields of the input token being processed in the prepare stage 202. During inactivity, state array 211 stores the context and state of each FSM instance of the multiple FSM instances of VMI FSM 108 (see FIG. 1). The preparation stage may also include pre-decoding of other input token fields (not shown) in order to provide useful signals to the FSM instance referenced by the slot field (e.g., sub-types, packet sequence number, port of arrival, etc.).

Stage 202 may also include computation steps such as comparing the sequence number to the expected sequence number of the context to supply a Boolean indicator to decision stage 203 to indicate whether or not the sequence number is correct.

In the decision stage 203, a classical transformation by the logic of FSM 224 takes place that includes generating a new state (i.e., new_state), generating one or more output tokens (i.e., output_token(s)), and calling an internal support function 226 (i.e., internal support_method call), as specified below:

new_state=f(current_state, context, input_token, environment_status)

output_token(s)=f(current_state, context, input_token, environment_status)

internal support_method call=f(current_state, context, input_token, environment_status), where current_state is the state included in context/state 214, context is the context included in context/state 214, input_token is the value of input data field 212, and environment_status is an indicator of the status of an environment acted upon by the data in the one or more output tokens.

In one embodiment, environment_status indicates the availability of a computer resource (e.g., unit) whose access is requested by a command included in an output token.

An output token generated by the logic of FSM 224 includes the fields valid 228, slot 230, output-data 232, and context/state 234. The valid field 228 includes the contents of valid field 208 and the slot field 230 includes the contents of slot field 210 (i.e., the contents of the valid field and the slot field travel unchanged through the pipeline). The context/state field 234 includes the new (i.e., updated) state and context generated by FSM 224. The context in context/state field 234 is an updated context if the input token instructs the FSM to update a mode. The valid field 228 includes the Boolean value of "true" placed in valid field 208, thereby indicating that the updated state and context are to be written to context/state array 211. The updated state and context are to be written to array 211 at a slot referenced by the address in slot field 230 so that the updated state and context are visible to the next token that references the same slot.

The output-data field 232 includes one or more application-dependent output values and the output values may be structured hierarchically. In one embodiment, the output token is the triple {valid, slot, output-data}, where output-data={target, cmd, misc} and misc={address, packet}.

For example, the header of a received packet (e.g., InfiniBand packet) has been checked in the FSM 224 and found to be correct. The address at which the payload of the received packet needs to be stored is determined and the new state indicates waiting for the completion of storage of the input token. The output token is to trigger the action of storing the payload outside of the FSM 224. In the example of this paragraph, the output-data includes target=store_unit (i.e., send the output token to the external unit called "store_unit"), cmd=store_payload and address=xxx (i.e., a memory address), and packet=handle (i.e., handle was passed by the input token and denotes a location in the external unit where the total received packets (i.e., header and payload) are temporarily stored. In refinish stage 204, valid field 228 and context/state 234 write the new state and context in context/state 234 back to state array 211 in response to determining that the valid field 228 has a Boolean value of "true." The new state and context are written to array 211 at the slot referenced by the address in slot field 230. Further finalization steps to refine the output token(s) may be performed as appropriate. In another embodiment, the value of another field (not shown)

independent of the valid field 228 determines whether or not the new state and context are written back to state array 211.

In an alternate embodiment, input data field 212 includes a plurality of addresses (e.g., in one or more slot fields) that references a set of FSM instances of the multiple FSM instances of VMI FSM 108 (see FIG. 1). In this case, the pipeline stages 202, 203 and 204 may be different for each FSM instance in the set of FSM instances.

Assigned to decision stage 203 may be one or more support functions including support function 226. A support function may provide, for example, timing support (e.g., start/stop time-out counter).

After an input token progresses beyond stage 201 as described above, arbitrate component 106 may select and mux a next input token derived from a signal of N input signals. In this way, system 200 provides a pipeline processing of VMI FSM 108 (see FIG. 1) that processes the N input signals via N input tokens by using only one instance of logic executed by a single hardware FSM implementation 224. That is, system 200 does not include or use N FSM logic instances to calculate the next state and output values for the N input signals. Further, system 200 provides a pipeline processing of VMI FSM 108 (see FIG. 1), which uses a single context/state array 211 that specifies the current states of N FSM instances, and does not include or use N current state registers that store the current states of N instances of an FSM in a one-to-one correspondence.

FIG. 2 FIG. 2 FIG. 2 FIG. 2 FIG. 2 FIG. 2 FIG. 2 FIG. 2 FIG. 2 FIG. 2 FIG. 2 FIG. 2 FIG. 2 As most state transitions (e.g., in I/O chip applications) are serial in nature (i.e., packets arrive one after the other, packets can be sent only one after the other, and packets can be built only as buffer space becomes available), the serializing nature of the present invention is a good fit for such state transitions. The pipeline in the present invention allows the application of speed-up techniques, such as pre-decode.

Processing by Virtual Multiple Instance FSMs

Figure 3:
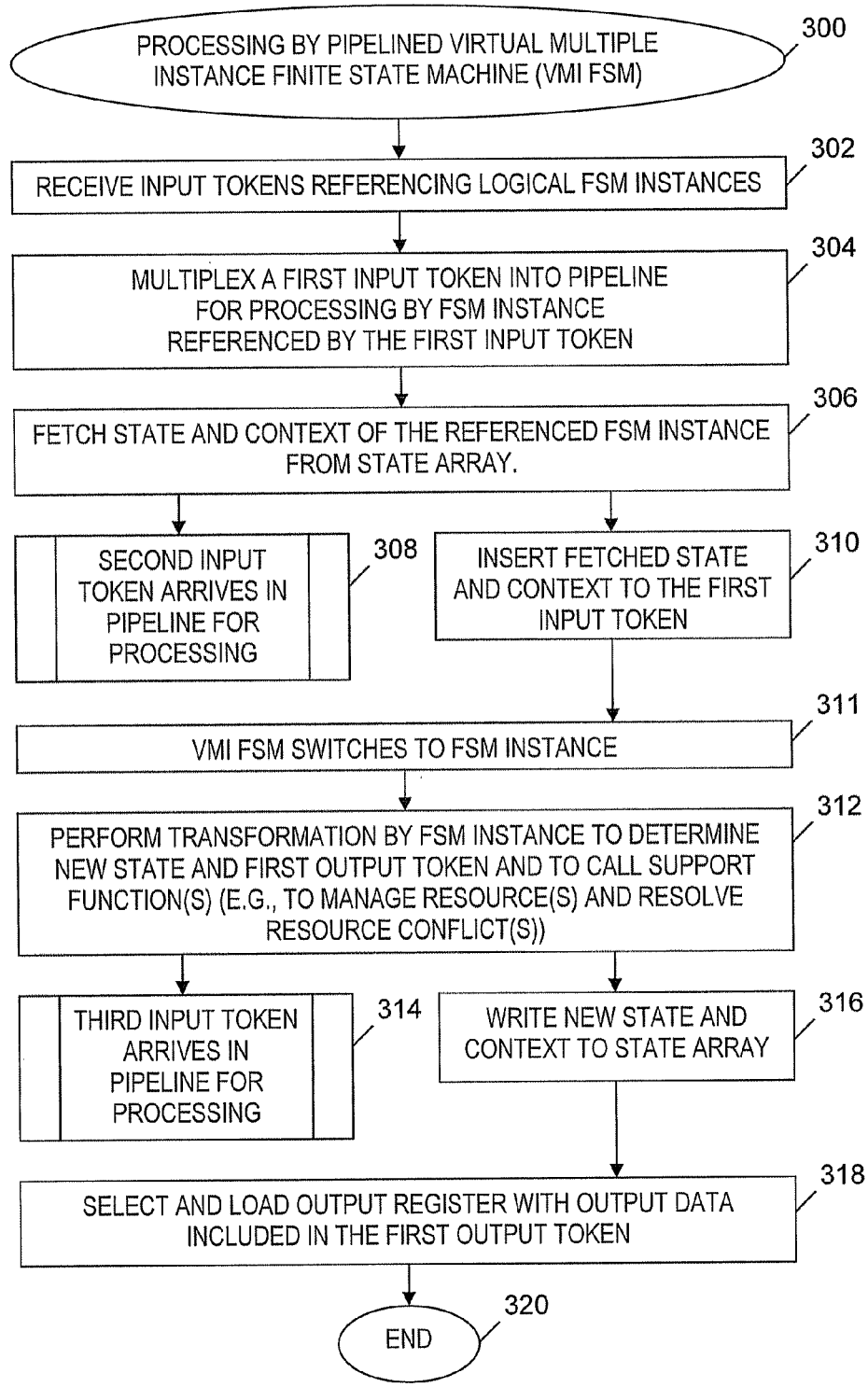
FIG. 3 is a flowchart of steps for processing by pipelined virtual multiple instance finite state machines, in accordance with embodiments of the present invention.

FIG. 3 is a flowchart of steps for processing by pipelined VMI FSM 108 (see FIG. 1), in accordance with embodiments of the present invention. The steps for processing by VMI FSM 108 (see FIG. 1) begin at step 300. In step 302, arbitrate component 106 (see FIG. 1 or FIG. 2) receives multiple input tokens via multiple FIFO buffers 102-1, . . . , 102-N (see FIG. 1) and via optional multiple guards 104-1, . . . , 104-N (see FIG. 1). In step 304, arbitrate component 106 (see FIG. 1) multiplexes the multiple input tokens and selects a first input token of the multiple input tokens for processing by a FSM instance of the VMI FSM 108 (see FIG. 1), where the FSM instance is referenced by the first input token (i.e., referenced by the contents of a field of the first input token) (e.g., slot field 210 in FIG. 2). Steps 302 and 304 are included in arbitrate stage 201 (see FIG. 2).

In step 306, VMI FSM 108 (see FIG. 1) fetches the state and context of the aforementioned FSM instance referenced by the first input token. The state and context is fetched from state array 211 (see FIG. 2) in step 306. In step 308, a second input token arrives in the pipeline for VMI FSM 108 (see FIG. 1) via a selection by arbitrate component 106 (see FIG. 1 or FIG. 2) in a step analogous to step 304. In step 310, VMI FSM 108 (see FIG. 1) inserts the state and context fetched in step 306 to the first input token. Steps 306 and 310 are included in prepare stage 202 (see FIG. 2).

In step 311, the VMI FSM 108 (see FIG. 1) switches to the aforementioned FSM instance referenced by the first input token by receiving the first input token including the fetched state and context.

In step 312, the aforementioned FSM instance referenced by the first input token performs a classical state transition by a finite state machine that includes (1) determining a new state of the FSM instance as a function of the current state and context fetched in step 306, data included in the first input token, and an indicator of the status of availability of a resource associated with the first input token; (2) determining a first output token as a function of the current state and context fetched in step 306, data included in the first input token, and an indicator of the status of availability of a resource associated with the first input token; and (3) calling an internal support function (e.g., support function 226 in FIG. 2) that is a function of the current state and context, data included in the first input token, and an indicator of the status of an environment associated with the first input token. Step 312 is included in decide stage 203 (see FIG. 2).

In step 314, a third input token arrives in the pipeline for VMI FSM 108 (see FIG. 1) via a selection by arbitrate component 106 (see FIG. 1 or FIG. 2) in a step analogous to step 304. In step 316, VMI FSM 108 (see FIG. 1) writes the new state and context determined in step 312 into state array 211 (see FIG. 2). In step 318, the aforementioned FSM instance referenced by the first input token selects an output register and loads the selected output register with output data included in the first output token. Steps 316 and 318 are included in refinish stage 204 (see FIG. 2). The processing of the aforementioned second input token and third input token includes steps analogous to steps 304, 306, 310, 312, 316 and 318. The process of FIG. 3 ends at step 320.

I/O Protocol Implementation

One embodiment of the present invention uses the VMI FSM for the processing of an I/O protocol (e.g., by a host channel adapter in an InfiniBand architecture). InfiniBand, developed by the InfiniBand Trade Association located in Beaverton, Oreg., is an I/O architecture and a specification for the transmission of data between processors and I/O devices. InfiniBand sends data in serial (e.g., via a point-to-point bidirectional serial link) and carries multiple channels of data at the same time in a multiplexing signal. An InfiniBand protocol may advantageously use VMI FSM 108 (see FIG. 1) to implement the processing of an I/O protocol on an adapter in the InfiniBand architecture (e.g., on an I/O chip), where the I/O protocol uses data packets and is characterized by dedicated wait queues for different types of protocol packets. In one embodiment, the processing of the I/O protocol on an adapter includes the processes shown in FIGS. 5A and 5B.

Figure 4:
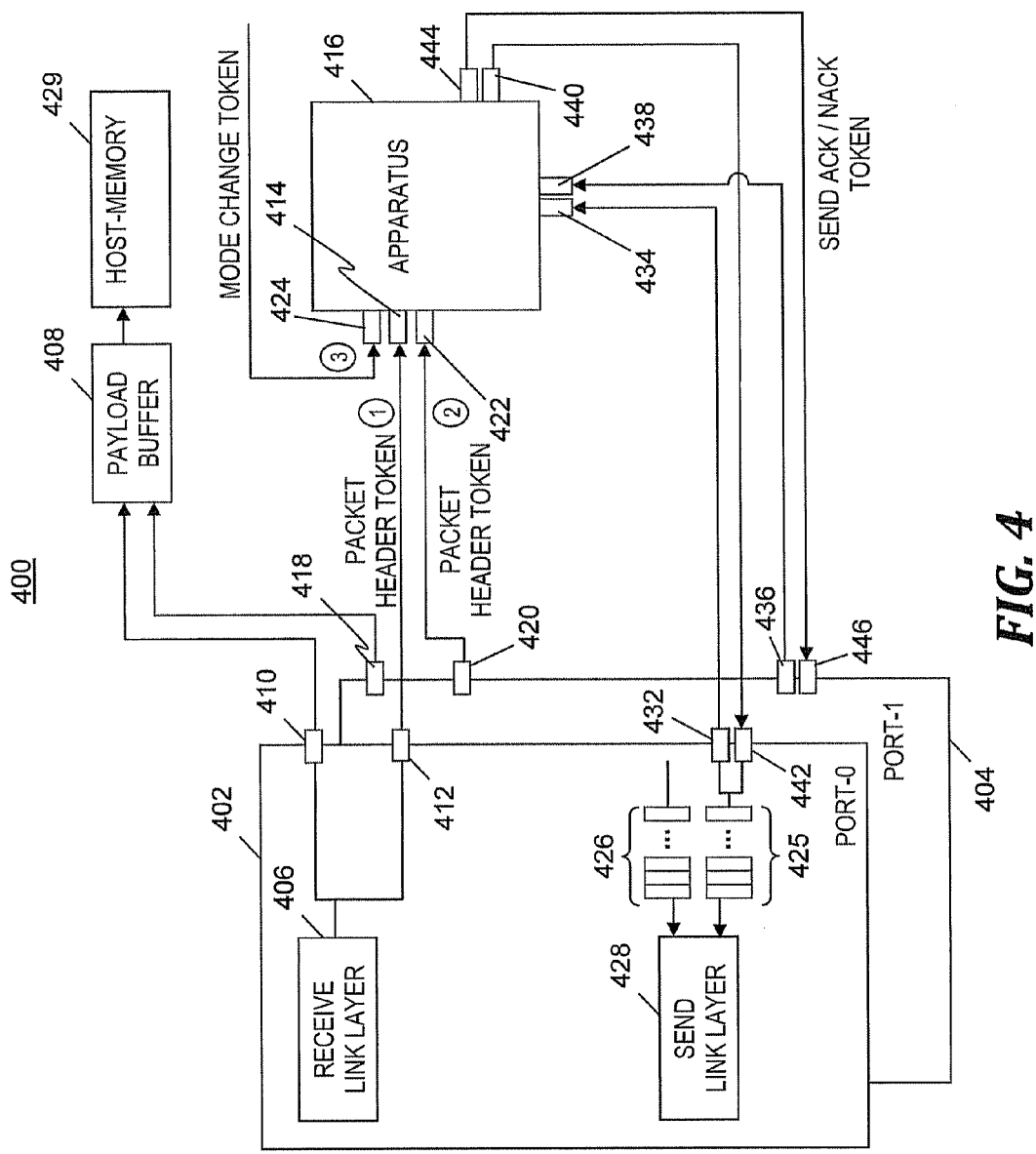
FIG. 4 is an exemplary system for implementing multiple logical finite state machines that process data packets using an I/O protocol, in accordance with embodiments of the present invention.

FIG. 4 is an exemplary system for using VMI FSM 108 in FIG. 1 to implement multiple logical finite state machines that process data packets using an I/O protocol (e.g., InfiniBand network protocol), in accordance with embodiments of the present invention.

Example 400 includes port 402 and port 404 (i.e., PORT-0 and PORT-1, respectively). PORT-0 and PORT-1 receive data packets (e.g., InfiniBand data packets). Each received data packet includes a payload and a packet header (a.k.a. packet-header). PORT-0 receives a first data packet via a receive link layer 406 and temporarily stores the payload of the first data packet into a payload buffer 408 via an input 410. PORT-0 logic extracts the Queue Pair (QP) number from a packet header of the first data packet and stores the QP number in a token-header of a packet header token (a.k.a. packet-header token) (e.g., stores the QP number in slot field 210 in FIG. 2 and stores the other fields of the packet header in input data field 212 in FIG. 2). The QP number (a.k.a. QP-number) uniquely identifies a network connection and is uniquely associated with a FSM instance. The token-header includes the following fields: {valid, QP-number, type}, which is the token-header format shared by all packet header tokens in example 400. PORT-0 sends the packet header of the first data packet inside a packet header token (a.k.a. packet-header token) from input 412 of PORT-0 to input register 414 of an apparatus 416 that implements VMI FSM 108 (see FIG. 1). For example, apparatus 416 is included in a digital I/O chip (e.g., InfiniBand chip) of a computer system. Each packet header token sent to apparatus 416 in example 400 includes the following fields: {valid, QP-number, type=packet-header; packet-header}. The packet-header field requires a reference (i.e., a handle) to uniquely identify the payload of the packet within the payload buffer 408. This handle is then passed forward to the output token that is sent to the payload buffer 408, so that the payload buffer knows which of the payload sets to act upon (e.g., store into a Basic Storage Module or drop). After the apparatus 416 determines that the packet header of the first data packet is valid by using the contents of the valid field, the apparatus identifies the address of the payload of the first data packet, and the apparatus determines that the payload is to be stored at a first address (e.g., address x) in a memory 429 of a host computer system (i.e., host-memory; a.k.a. Basic Storage Module or BSM). The apparatus 416 generates a first output token that is routed to payload buffer 408. The first output token instructs the payload buffer 408 to store the payload of the first data packet at the aforementioned first address in host-memory 429.

As one example, the received data packet is the response to a read request to a disk and a software application directs the data that is read as a result of the read request (i.e., the payload of the received data packet) to be written at address x in order to subsequently process the written data.

Similarly, PORT-1 receives a second data packet via a link layer (not shown) and temporarily stores the payload of the second data packet into payload buffer 408 via an input 418. PORT-1 logic extracts the Queue Pair (QP) number from a packet header of the second data packet and stores the QP number from the second data packet in a token-header of a second packet header token. PORT-1 sends the packet header of the second data packet inside a packet header token from input 420 of PORT-1 to input register 422 of apparatus 416.

After the apparatus 416 determines that the packet header of the second data packet is valid by using the contents of the valid field, the apparatus identifies the address of the payload of the second data packet, and the apparatus determines that the payload is to be stored at a second address (e.g., address y) in host-memory 429. The apparatus 416 generates a second output token that is routed to payload buffer 408. The second output token instructs the payload buffer 408 to store the payload of the second data packet at the aforementioned second address in host-memory 429.

In the scenario used in example 400, two packet header tokens arrive at apparatus 416. The first packet header in the packet header token labeled as "1" for QP-number=A arrives via PORT-0 and a second packet header in packet header token labeled as "2" for QP-number=B arrives via PORT-1. The arrivals of the first and second packet headers are followed by the arrival of a mode change token labeled as "3" at apparatus 416 via input register 424. The mode change token is issued by code in the course of a preparation sequence to activate QP-number=C. Similar to the packet header tokens, the mode change token includes a token-header having the following layout: {valid, QP-number, type=mode_change; change protocol to xx}. In one example, "change protocol to xx" is "change protocol to RC," where RC is defined as the Reliable Connect protocol of the InfiniBand architecture and RC identifies a transport mode of a QP.

The first and second packet header tokens and the mode change token enter the pipeline of the VMI FSM 108 (see FIG. 1) as illustrated by example 400 via input FIFO buffers 102-1, 102-2, . . . 102-N (see FIG. 1), guards 104-1, 104-2, . . . , 104-N (see FIG. 1) and the arbitrate component 106 (see FIG. 1). Sets of output tokens 425 and 426 are generated and sent to a send link layer (e.g., send link layer 428).

Figure 5A:
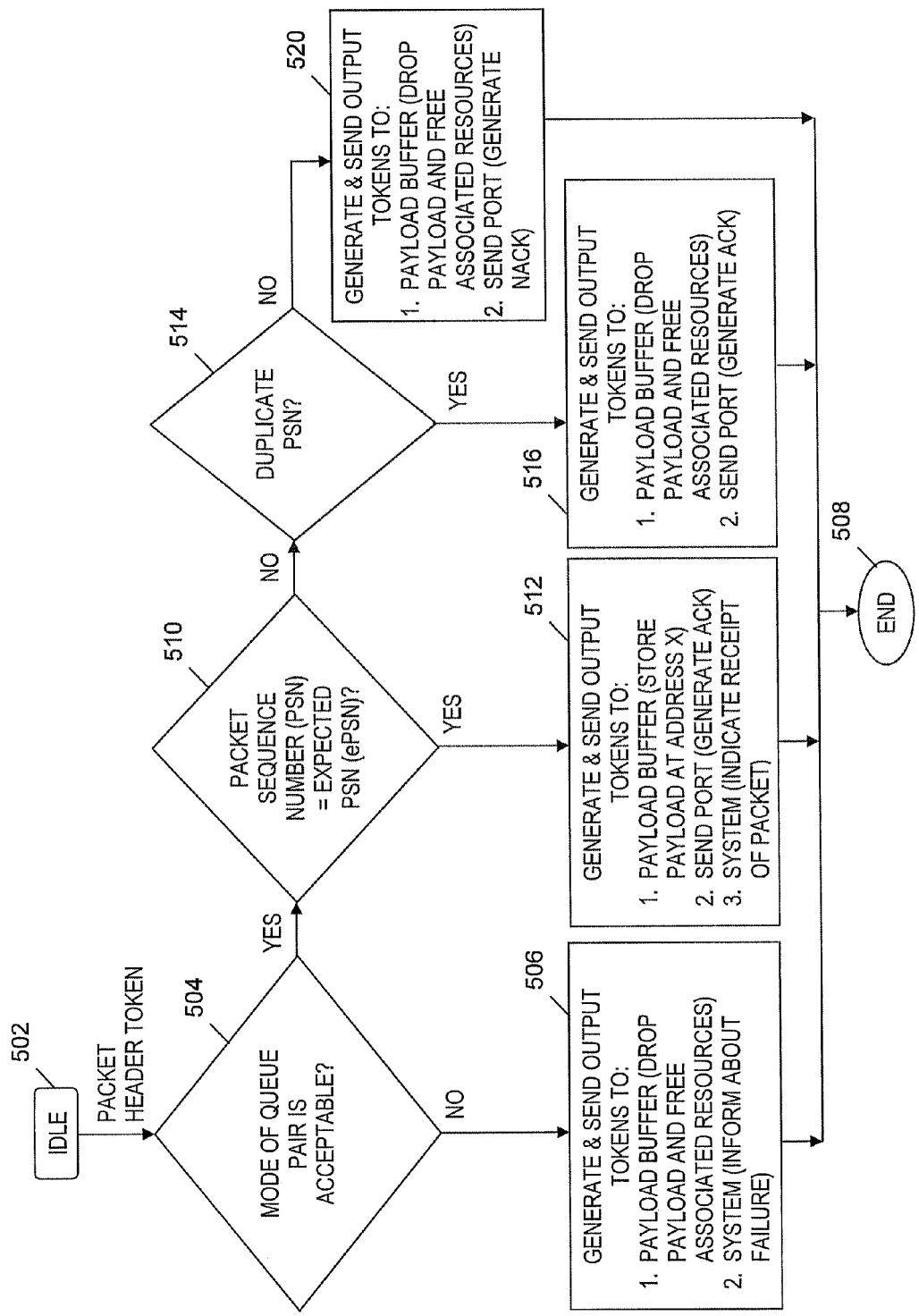
FIG. 5A is a flowchart of steps for processing a packet header token using an I/O protocol in the exemplary system of FIG. 4, in accordance with embodiments of the present invention.
Figure 5B:
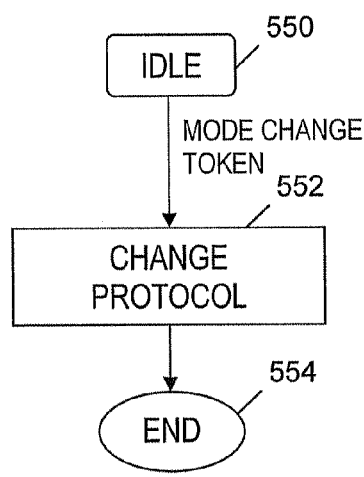
FIG. 5B is a flowchart of steps for processing a mode change token using an I/O protocol in the exemplary system of FIG. 4, in accordance with embodiments of the present invention.

In one embodiment, according to the I/O protocol, the tasks shown in the steps of FIG. 5A and FIG. 5B are carried out. A send ACK token or send NACK token may be sent from output register 440 to input 442 and from output register 444 to input 446, as described below relative to FIG. 5A, FIG. 6B, and FIG. 6C.

In one embodiment, an identifier other than a QP number is extracted from the input token, where the extracted identifier identifies a connection, unit, or other entity that has a state and context and that selects a FSM instance and its context variables.

For an application of the present invention that uses a connection oriented protocol, the identifier extracted from the input token identifies a connection (e.g., for an InfiniBand Reliable Connect, a connection is identified by a QP number).

For an application that uses a connectionless protocol, some other field e.g., a number selecting a currently idle FSM instance could be used to carry out the task. Or e.g., the input port number selects the FSM instance and the environment variables. If there is a buffer in a BSM behind the port, that is filled to be read by software, then the address is increased and checked against limits. Packets are stored in order or are dropped in response to no space being available. Packets for another port with another buffer select a different FSM instance and environment variables.

FIG. 5A is a flowchart of steps for processing a packet header token using an I/O protocol in the exemplary system of FIG. 4, in accordance with embodiments of the present invention. Prior to the arrival of a packet header token at apparatus 416 (see FIG. 4), system 400 (see FIG. 4) is in an idle state 502.

Prior to step 504, apparatus 416 (see FIG. 4) receives a packet header token from a port (e.g., PORT-0 in FIG. 4) (see steps 302 and 304 in FIG. 3). Hereinafter, in the discussion of FIG. 5A, the packet header token received prior to step 504 is referred to simply as "the packet header token." In response to apparatus 416 (see FIG. 4) receiving the packet header token, the apparatus examines the packet header included in the packet header token and identifies and extracts the QP number included in the packet header. Hereinafter, in the discussion of FIG. 5A, the packet header included in the packet header token is referred to simply as "the packet header." In step 504, apparatus 416 (see FIG. 4) determines whether the mode of the QP identified by the QP number is acceptable based on predefined criteria. In one embodiment, apparatus 416 (see FIG. 4) determines in step 504 whether the mode of the QP identified by the QP number is Reliable Connect (RC) or Reliable Datagram (RD). RC and RD are transport modes defined by the InfiniBand architecture specification provided by the InfiniBand Trade Association.

If step 504 determines that the mode of the QP is not acceptable (e.g., determines that the mode of the QP is not RD or RC), then a failure is detected and the No branch is taken and step 506 is performed. In step 506, the apparatus 416 (see FIG. 4) generates and sends one or more output tokens to payload buffer 408 (see FIG. 4) to drop (i.e., delete) the payload of the packet header token in the payload buffer, thereby freeing one or more resources associated with the payload. Further, in step 506, the apparatus 416 (see FIG. 4) generates and sends one or more output tokens to the system that includes apparatus 416 (see FIG. 4) to inform the system about the failure detected at step 504. Following step 506, the process of FIG. 5A ends at step 508.

If step 504 determines that the mode of the QP is acceptable (e.g., determines that the mode of the QP is RD or RC), then the Yes branch is taken and apparatus 416 (see FIG. 4) determines in step 510 whether the packet sequence number (PSN) included in the packet header is equal to an expected packet sequence number (ePSN).

If step 510 determines that the PSN equals the ePSN, then in step 512, the apparatus 416 (see FIG. 4) generates and sends one or more output tokens to each of the following: (1) payload buffer 408 (see FIG. 4) to store the payload of the packet header token in the payload buffer at an address specified in the output token; (2) the send port (i.e., the port that sent the packet header token; e.g., PORT-0 in FIG. 4), which thereby receives an acknowledgment (Ack); and (3) the system that includes apparatus 416 (see FIG. 4) to indicate a receipt of the data packet. Following step 512, the process of FIG. 5A ends at step 508.

If step 510 determines that the PSN is not equal to the ePSN, then in step 514, apparatus 416 (see FIG. 4) determines whether the PSN is a duplicate of a previously processed PSN.

If step 514 determines that the PSN is a duplicate, then in step 516, the apparatus 416 (see FIG. 4) generates and sends one or more output tokens to payload buffer 408 (see FIG. 4) to delete the payload of the packet header token in the payload buffer, thereby freeing one or more resources associated with the payload. Further, in step 516, the apparatus 416 (see FIG. 4) generates and sends one or more output tokens to the send port (i.e., the port that sent the packet header token; e.g., PORT-0 in FIG. 4), which thereby receives an acknowledgment (Ack). Following step 516, the process of FIG. 5A ends at step 508.

If step 514 determines that the PSN is not a duplicate of a previously processed PSN, then the No branch is taken, indicating that the PSN is a mismatch of the ePSN and is not a duplicate. Taking the No branch of step 514 is followed by step 520. In step 520, the apparatus 416 (see FIG. 4) generates and sends one or more output tokens to payload buffer 408 (see FIG. 4) to delete the payload of the packet header token in the payload buffer, thereby freeing one or more resources associated with the payload. Further, in step 520, the apparatus 416 (see FIG. 4) generates and sends one or more output tokens to the send port (i.e., the port that sent the packet header token; e.g., PORT-0 in FIG. 4), which thereby receives a negative acknowledgment (Nack). Following step 520, the process of FIG. 5A ends at step 508.

FIG. 5B is a flowchart of steps for processing a mode change token using an I/O protocol in the exemplary system of FIG. 4, in accordance with embodiments of the present invention. Prior to the arrival of a mode change token at apparatus 416 (see FIG. 4), system 400 (see FIG. 4) is in an idle state 550. Prior to step 552, apparatus 416 (see FIG. 4) receives a mode change token issued by code external to system 400 (see FIG. 4). In response to apparatus 416 (see FIG. 4) receiving the mode change token, the apparatus identifies the QP number included in the mode change token and in step 552 updates the context (i.e., changes the protocol or transport mode of the QP identified by the QP number included the mode change token), which results in the apparatus performing desired behavior on future transactions for the QP. The process of FIG. 5B ends at step 554.

FIGS. 6A-6F include a sequence of illustrations that show processing in the pipeline of example 400 (see FIG. 4).

Figure 6A:
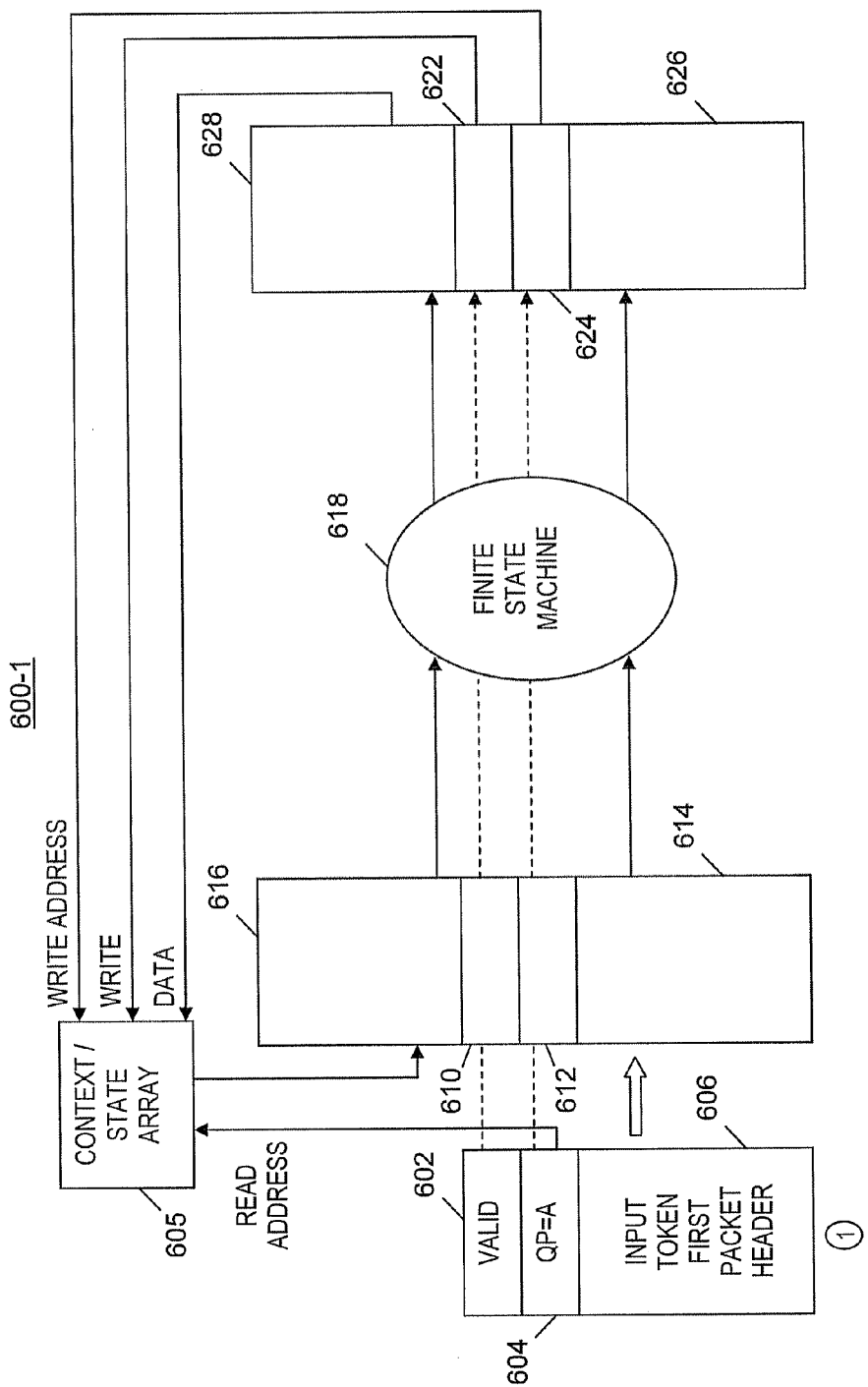
FIG. 6A is a block diagram that depicts a first set of steps in an exemplary processing in the system of FIG. 4, in accordance with embodiments of the present invention.

FIG. 6A is a block diagram that depicts a first set of steps in an exemplary processing in the system of FIG. 4, in accordance with embodiments of the present invention. A first set of steps 600-1 in the processing by the pipeline in example 400 (see FIG. 4) includes the arrival of a first packet header token as an input token (see steps 302 and 304 in FIG. 3) that includes a first packet header in a field 606, a QP-number field 604 that references the QP indicated by "A," and a Boolean flag in a VALID field 602 that indicates that the arriving input token is to acted upon in the current pipeline stage. That is, FIG. 6A illustrates a first packet header token arriving in the pipeline. Apparatus 416 (see FIG. 4) reads the context for the QP indicated by "A" from the context/state array 605 (see step 306 in FIG. 3) and stores the context in QP-number field 604 (see step 310 in FIG. 3).

In the first set of steps 600-1, fields 610, 612, 614 and 616 in a token in a preparation stage are not yet populated. FSM 618 has not yet performed a state transition to generate an output token having fields 622, 624, 626 and 628.

In one embodiment, fields of the first packet header token arriving in FIG. 6A (and other input tokens arriving in FIGS. 6B and 6C) may be pre-decoded to provide useful signals to FSM 618. For example, fields in the packet header token may specify one or more sub-types, a packet sequence number, a port of arrival, etc., which may be pre-decoded in the first set of steps 600-1. In one embodiment, a packet header token may be subject to pre-processing and post-processing. For example, pre-processing may include: (1) comparing the packet sequence number in the input token to the expected packet sequence number in the context prior to the input token being received by FSM 618 and (2) forwarding a Boolean flag indicating whether the packet sequence number is the expected packet sequence number. An example of post-processing may include a Boolean signal generated by FSM 618 after the FSM processes the input token, where the Boolean signal activates logic that increments the expected packet sequence number of the context.

Figure 6B:
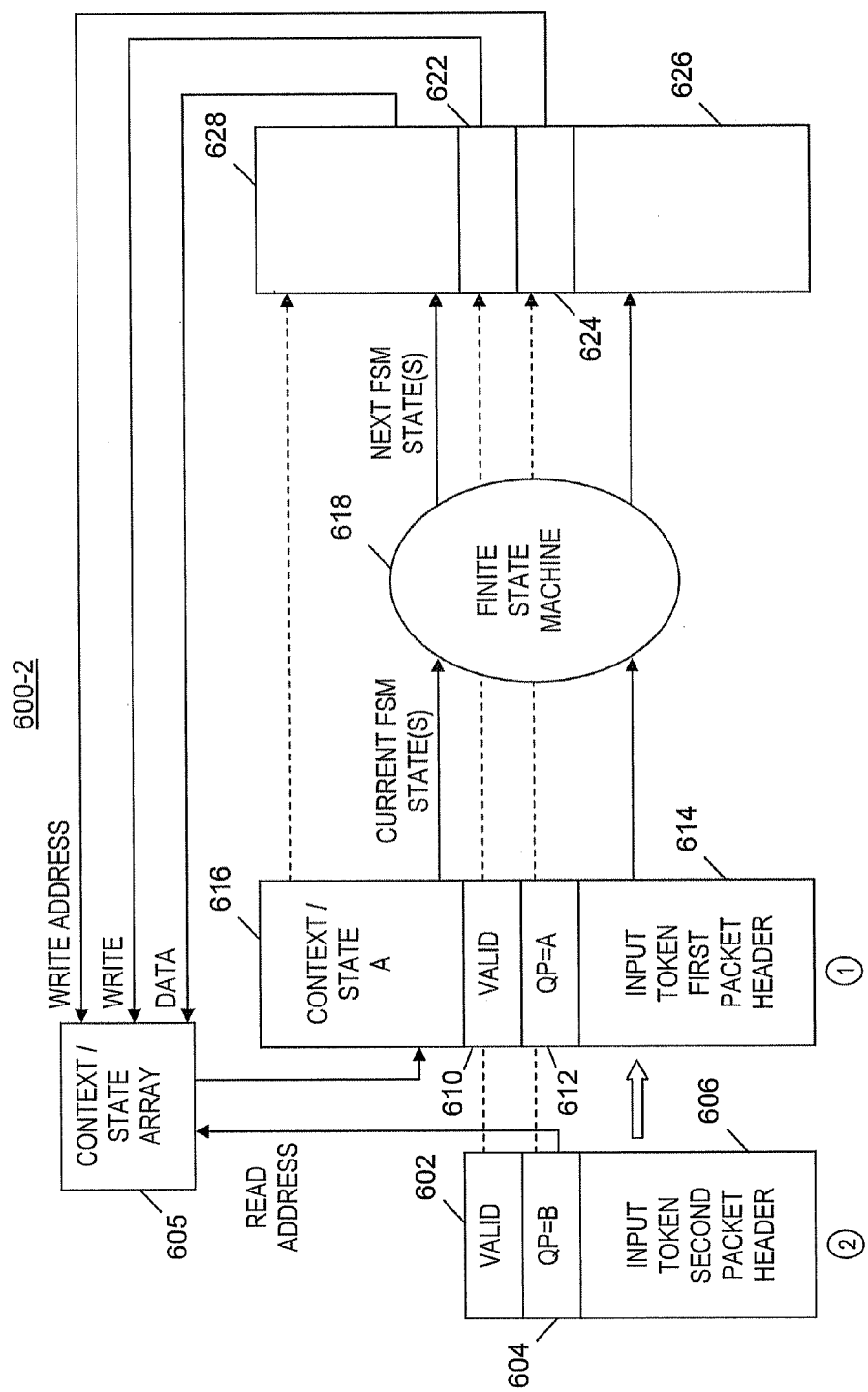
FIG. 6B is a block diagram that depicts a second set of steps in the exemplary processing in the system of FIG. 4, where the second set of steps follows the first set of steps in FIG. 6A, in accordance with embodiments of the present invention.

FIG. 6B is a block diagram that depicts a second set of steps in the exemplary processing in the system of FIG. 4, where the second set of steps follows the first set of steps in FIG. 6A, in accordance with embodiments of the present invention. A second set of steps 600-2 in the processing by the pipeline in example 400 (see FIG. 4) follows the set of steps 600-1 (see FIG. 6A). Set of steps 600-2 includes the arrival of a second packet header token as an input token (see steps 302 and 304 in FIG. 3) that includes a second packet header in field 606, QP-number field 604 that references the QP indicated by "B," and a Boolean flag in VALID field 602 that indicates the arriving input token is to be acted upon by the current pipeline stage. That is, FIG. 6B illustrates a second packet header token arriving in the pipeline. Apparatus 416 (see FIG. 4) reads the context for the QP indicated by "B" from the context/state array 605 (see step 306 in FIG. 3) and stores the context in QP-number field 604 (see step 310 in FIG. 3).

In one embodiment, fields of the second packet header token arriving in FIG. 6B may be pre-decoded to provide useful signals to FSM 618. For example, fields in the second packet header token may specify one or more subtypes, a packet sequence number, a port of arrival, etc., which may be pre-decoded in the second set of steps 600-2.

The first packet header token that arrived in FIG. 6A moves to a preparation stage in FIG. 6B, and is illustrated by fields 610, 612, 614 and 616. The contents of field 606 in FIG. 6A become the contents of field 614 in FIG. 6B. The contents of QP-number field 604 in FIG. 6A (i.e., QP=A) become the contents of field 612 in FIG. 6B. The contents of VALID field 602 in FIG. 6A become the contents of field 610 in FIG. 6B.

The context read in FIG. 6A and the current state of FSM 618 (i.e., context/state A) are added to the first packet header token as the contents of field 616.

Information required to carry out the transition included in step 312 (see FIG. 3) is available. That is, the current state of FSM 618, the input event (i.e., the input token is a packet header token), and context fields are available in the second set of steps 600-2. The current state of FSM 618 and the context fields were retrieved from context/state array 605 in FIG. 6A. The aforementioned context fields include the transport mode of the QP (e.g., RC or RD) and the expected PSN.

FSM 618 sends a send Ack token into an available send Ack FIFO slot of PORT-0. Further, FSM 618 performs state transition actions to obtain a next state, which will be illustrated in fields 622, 624, 626, and 628.

Figure 6C:
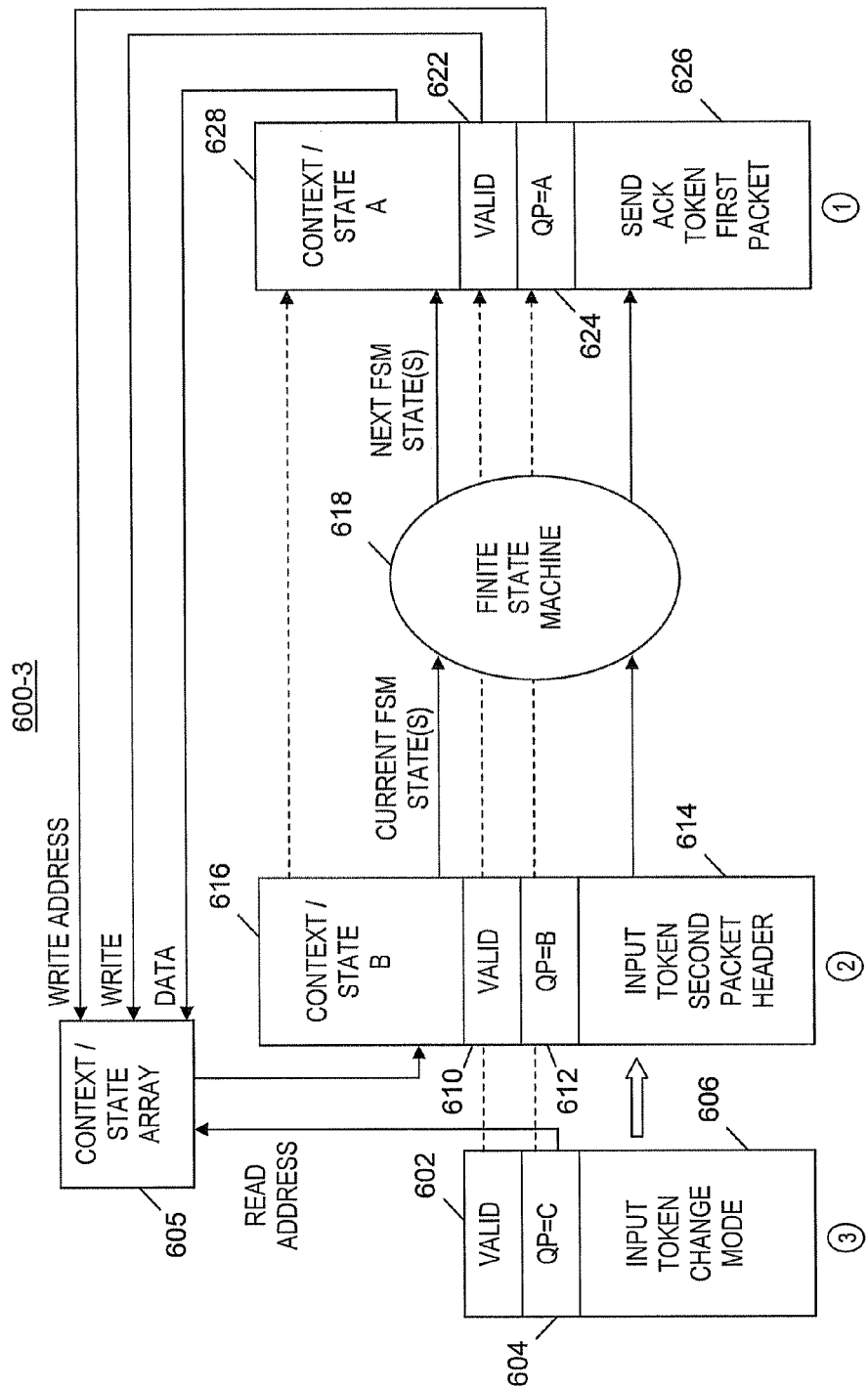
FIG. 6C is a block diagram that depicts a third set of steps in the exemplary processing in the system of FIG. 4, where the third set of steps follows the second set of steps in FIG. 6B, in accordance with embodiments of the present invention.

FIG. 6C is a block diagram that depicts a third set of steps in the exemplary processing in the system of FIG. 4, where the third set of steps follows the second set of steps in FIG. 6B, in accordance with embodiments of the present invention. A third set of steps 600-3 in the processing by the pipeline in example 400 (see FIG. 4) follows the set of steps 600-2 (see FIG. 6B). Set of steps 600-3 includes the arrival of a mode change token as an input token (see steps 302 and 304 in FIG. 3) that includes a "change mode" indicator in field 606, QP-number field 604 that references the QP indicated by "C," and a Boolean flag in VALID field 602 that indicates that the arriving mode change token is to be acted upon by the current pipeline stage. That is, FIG. 6C illustrates a mode change token arriving in the pipeline. Apparatus 416 (see FIG. 4) reads the context for the QP indicated by "C" from the context/state array 605 (see step 306 in FIG. 3) and stores the context in QP-number field 604 (see step 310 in FIG. 3).

In one embodiment, fields of the mode change token arriving in FIG. 6C may be pre-decoded to provide useful signals to FSM 618. For example, a context.protocol field in the mode change token may specify the value of the context target, which may be pre-decoded in the third set of steps 600-3.

The second packet header token that arrived in FIG. 6B moves to a preparation stage in FIG. 6C, and is illustrated by fields 610, 612, 614 and 616. The contents of field 606 in FIG. 6B become the contents of field 614 in FIG. 6C. The contents of QP-number field 604 in FIG. 6B (i.e., QP=B) become the contents of field 612 in FIG. 6C. The contents of VALID field 602 in FIG. 6B become the contents of field 610 in FIG. 6C. The context read in FIG. 6B and the current state of FSM 618 (i.e., context/state B) are added to the second packet header token as the contents of field 616.

Information required to carry out the transition in step 312 in FIG. 3 is available. That is, the current state of FSM 618, the input event (i.e., the input token is a packet header token), and context fields are available in the third set of steps 600-3. The current state of FSM 618 and the context fields were retrieved from context/state array 605 in FIG. 6B. The aforementioned context fields include the transport mode of the QP (e.g., RC or RD) and the expected PSN.

The first packet header token, as decided by FSM 618 in the previous cycle (see FIG. 6B), asserts a send Ack token included in field 626. The send Ack token is sent to the PORT-0 send Ack function. The contents of QP-number field 612 in FIG. 6B (i.e., QP=A) become the contents of field 624 in FIG. 6C. The contents of VALID field 610 in FIG. 6B become the contents of field 622 in FIG. 6C. The contents of field 628 include the context of the QP indicated by QP-number field 624 (i.e., QP=A) and the next (i.e., new) state of the QP. The context and state in field 628 is written back into context/state array 605 (see step 316 in FIG. 3) at an address indicated by QP=A in field 624.

The token labeled "1" in FIGS. 6A, 6B and 6C is the packet header token labeled "1" in FIG. 4.

Figure 6D:
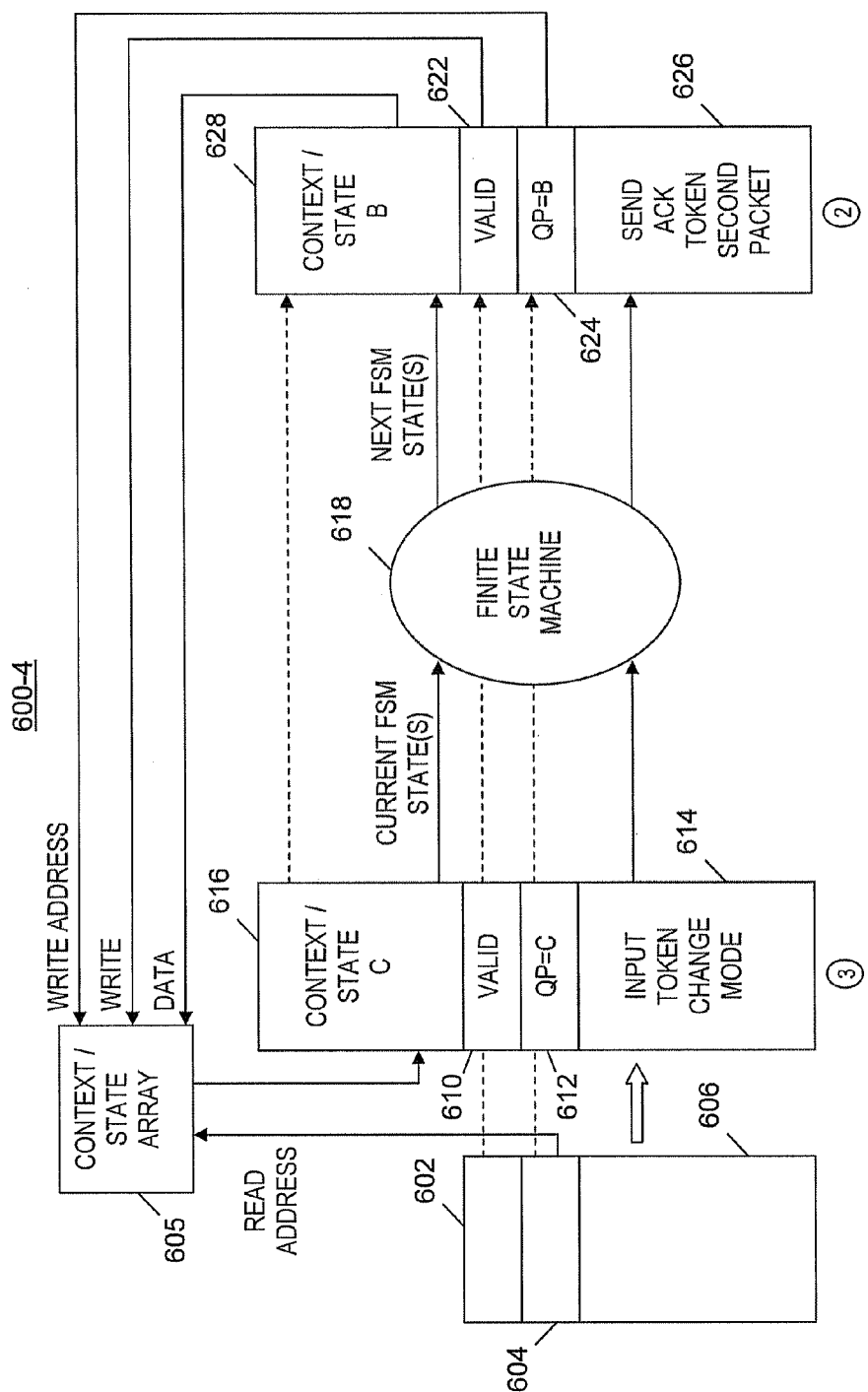
FIG. 6D is a block diagram that depicts a fourth set of steps in the exemplary processing in the system of FIG. 4, where the fourth set of steps follows the third set of steps in FIG. 6C, in accordance with embodiments of the present invention.

FIG. 6D is a block diagram that depicts a fourth set of steps in the exemplary processing in the system of FIG. 4, where the fourth set of steps follows the third set of steps in FIG. 6C, in accordance with embodiments of the present invention. A fourth set of steps 600-4 in the processing by the pipeline in example 400 (see FIG. 4) follows the set of steps 600-3 (see FIG. 6C). Set of steps 600-4 includes the mode change token that originally arrived in FIG. 6C in a preparation stage in FIG. 6D, and is illustrated by fields 610, 612, 614 and 616. The contents of field 606 in FIG. 6C become the contents of field 614 in FIG. 6D. The contents of QP-number field 604 in FIG. 6C become the contents of QP-number field 612 in FIG. 6D. The contents of VALID field 602 in FIG. 6C become the contents of VALID field 610 in FIG. 6D. The context read in FIG. 6C and the current state of FSM 618 (i.e., context/state C) are added to the mode change token as the contents of field 616.

Information required to carry out the transition included in step 312 (see FIG. 3) is available. That is, the current state of FSM 618, the input event (i.e., the input token is a mode change token), and the context fields are available in the fourth set of steps 600-4. The current state of FSM 618 and the context fields were retrieved from context/state array 605 in FIG. 6C.

FSM 618 moves the value of field 614 of the mode change token to the context.protocol field. In this case, the state is not changed to a new state.

The second packet header token, as decided by FSM 618 in the previous cycle (see FIG. 6C), asserts a send Ack token included in field 626. The send Ack token is sent to the PORT-1 send Ack function. The contents of QP-number field 612 in FIG. 6C (i.e., QP=B) become the contents of field 624 in FIG. 6D. The contents of VALID field 610 in FIG. 6C become the contents of field 622 in FIG. 6D. The contents of field 628 include the context of the QP indicated by QP-number field 624 (i.e., QP=B) and the next state of the QP. The context and state in field 628 are written back into context/state array 605.

The token labeled "2" in FIGS. 6B, 6C and 6D is the packet header token labeled "2" in FIG. 4.

Figure 6E:
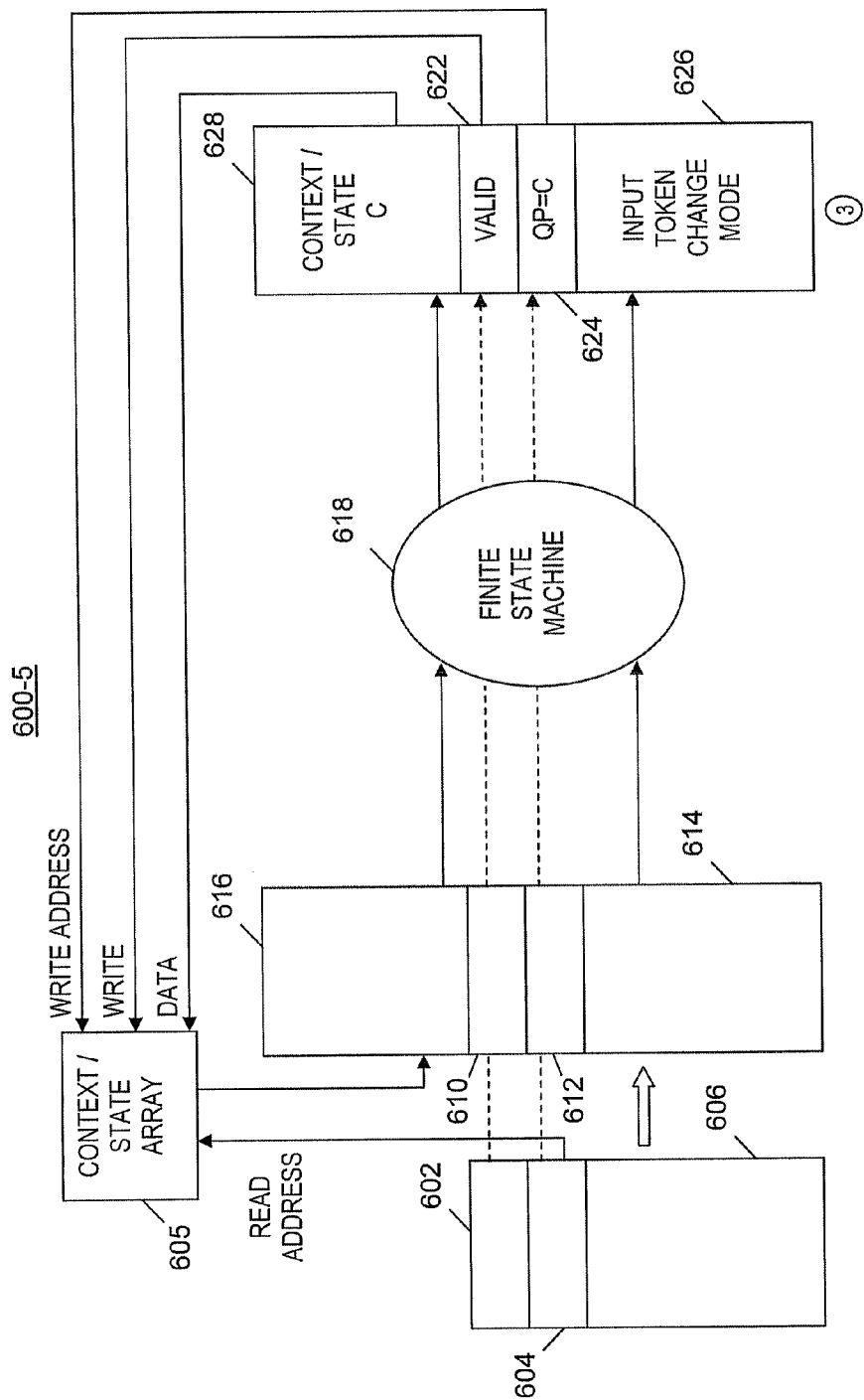
FIG. 6E is a block diagram that depicts a fifth set of steps in the exemplary processing in the system of FIG. 4, where the fifth set of steps follows the fourth set of steps in FIG. 6D, in accordance with embodiments of the present invention.

FIG. 6E is a block diagram that depicts a fifth set of steps in the exemplary processing in the system of FIG. 4, where the fifth set of steps follows the fourth set of steps in FIG. 6D, in accordance with embodiments of the present invention. Fifth set of steps 600-5 includes the change mode token in field 626 resulting from a decide stage of the FSM 618. The contents of QP-number field 612 in FIG. 6D (i.e., QP=C) become the contents of QP-number field 624 in FIG. 6E. The contents of VALID field 610 in FIG. 6D become the contents of VALID field 622 in FIG. 6E. The contents of field 628 include the updated context of the QP indicated by QP-number field 624 (i.e., QP=C) and the next state of the QP. The context and state in field 628 are written back into context/state array 605.

The token labeled "3" in FIGS. 6C, 6D and 6E is the mode change token labeled "3" in FIG. 4.

Replacing Multiple FSMs

Figure 7A:
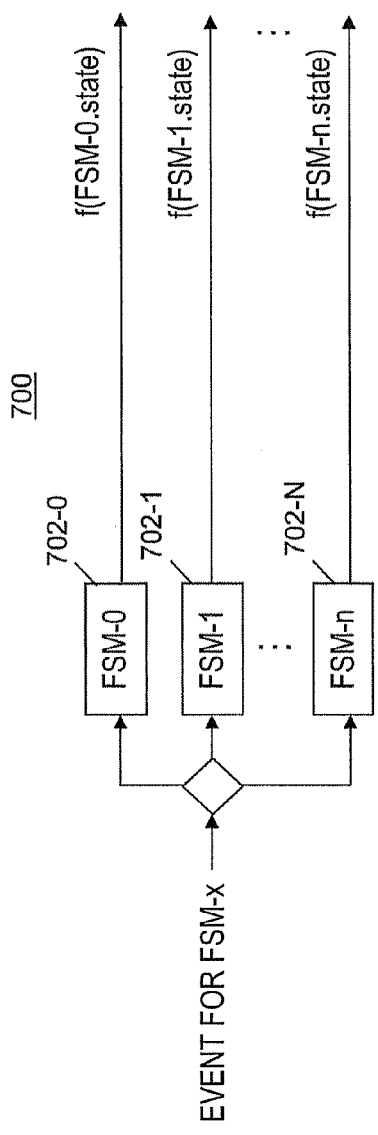
FIG. 7A depicts a prior art technique of routing sequential events to a set of target finite state machines.

FIG. 7A depicts a prior art technique of routing sequential events to a set of target finite state machines. In system 700, sequential events (i.e., "EVENT FOR FSM-x") are routed to a set of target FSMs 702-0, 702-1, . . . , 702-N, which react to the events. Each of the target FSMs drives signals into its vicinity dependent on the corresponding state. For example, FSM 702-0 (i.e., FSM-0) drives a signal dependent on the state of FSM-0, as illustrated by "f(FSM-0.state)" in FIG. 7A.

Figure 7B:
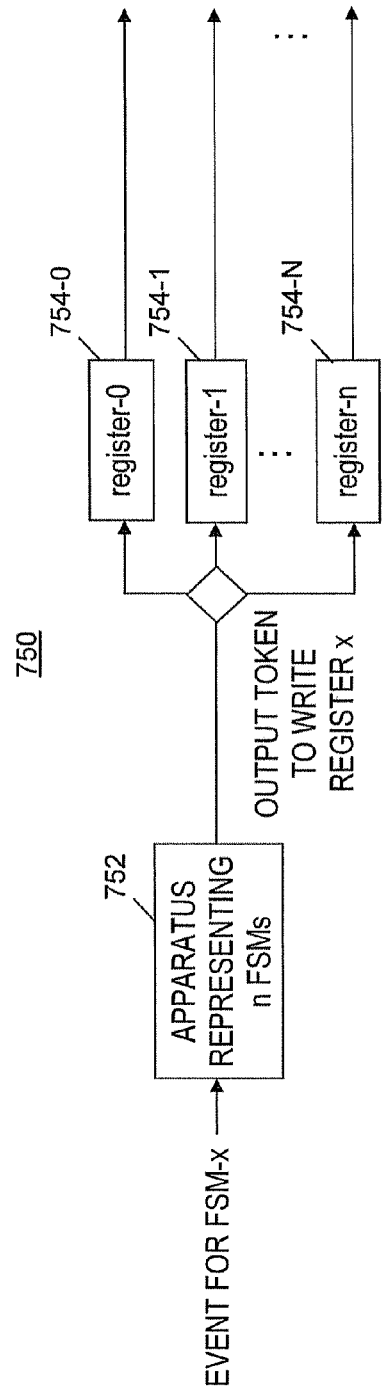
FIG. 7B depicts an example of routing sequential events using the system of FIG. 1, in accordance with embodiments of the present invention.

FIG. 7B depicts an example of routing sequential events using the system of FIG. 1, in accordance with embodiments of the present invention. System 750 includes an apparatus 752 that represents n FSMs (i.e., an implementation of VMI FSM 108 in FIG. 1). In an embodiment of the present invention, apparatus 752 replaces the set of target FSMs 702-0, 702-1, . . . , 702-N in FIG. 7A and generates a solution equivalent to the solution generated by system 700 (see FIG. 7A).

Multiple events enter apparatus 752. For each event entering apparatus 752, the apparatus selects the corresponding context and state of the target FSM of the event. The target FSM sends an output token to a corresponding register of registers 754-0, 754-1, . . . , 754-N, where the corresponding register drives the signal into its vicinity. For example, an event for finite state machine FSM-1 enters apparatus 752, the context and state of FSM-1 is selected, and FSM-1 sends a resulting output token to register 754-0 (i.e., register-0), which drives the signal into the vicinity of FSM-1.

System 750 illustrates that apparatus 752 is capable of replacing multiple conventional FSMs when the rate of events is lower than the rate that the apparatus is able to process tokens.

If there is a necessity to change the FSM behavior while running, then the serializing nature of system 750 will be advantageous.

Computer System

Figure 8:
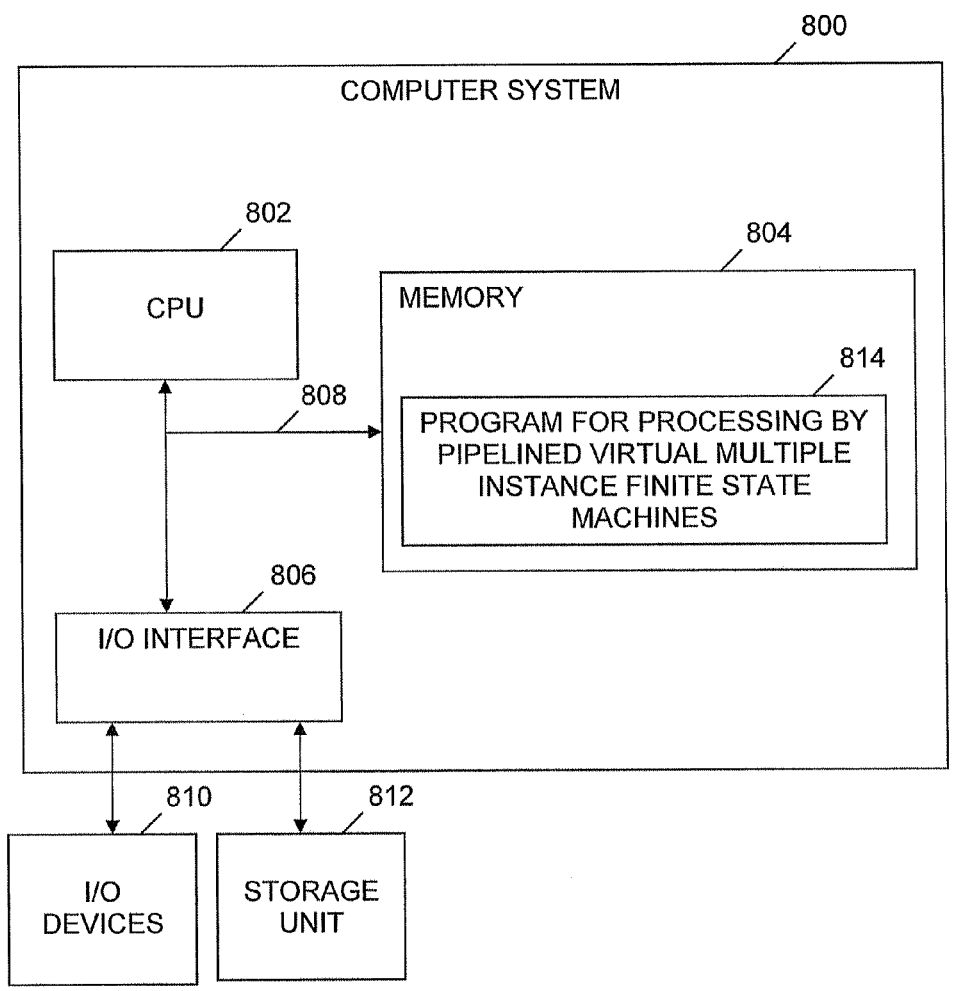
FIG. 8 is a computer system that is included in the system of FIG. 1 and that implements a process of FIG. 3, FIG. 5A or FIG. 5B, or a combination thereof, in accordance with embodiments of the present invention.

FIG. 8 is a computer system that is included in the system of FIG. 1 and that implements a process of FIG. 3, FIG. 5A or FIG. 5B, or a combination thereof, in accordance with embodiments of the present invention. Computer system 800 generally comprises a central processing unit (CPU) 802, a memory 804, an input/output (I/O) interface 806, and a bus 808. In one embodiment, computer system 800 implements pipelined VMI FSM 108 (see FIG. 1). Further, computer system 800 is coupled to I/O devices 810 and a computer data storage unit 812. CPU 802 performs computation and control functions of computer system 800. CPU 802 may comprise a single processing unit, or be distributed across one or more processing units in one or more locations (e.g., on a client and server).

Memory 804 may comprise any known computer readable storage medium, which is described below. In one embodiment, cache memory elements of memory 804 provide temporary storage of at least some program code (e.g., program code 814) in order to reduce the number of times code must be retrieved from bulk storage during execution. Moreover, similar to CPU 802, memory 804 may reside at a single physical location, comprising one or more types of data storage, or be distributed across a plurality of physical systems in various forms. Further, memory 804 can include data distributed across, for example, a local area network (LAN) or a wide area network (WAN).

I/O interface 806 comprises any system for exchanging information to or from an external source. I/O devices 810 comprise any known type of external device, including a display device (e.g., monitor), keyboard, mouse, printer, speakers, handheld device, facsimile, etc. Bus 808 provides a communication link between each of the components in computer system 800, and may comprise any type of transmission link, including electrical, optical, wireless, etc.

I/O interface 806 also allows computer system 800 to store and retrieve information (e.g., data or program instructions such as program code 814) from an auxiliary storage device such as computer data storage unit 812 or another computer data storage unit (not shown). Computer data storage unit 812 may comprise any known computer readable storage medium, which is described below. For example, computer data storage unit 812 may be a non-volatile data storage device, such as a magnetic disk drive (i.e., hard disk drive) or an optical disc drive (e.g., a CD-ROM drive which receives a CD-ROM disk).

Memory 804 may include computer program code 814 that provides the logic for processing by a pipelined VMI FSM (e.g., the process of FIG. 3). Further, memory 804 may include other systems not shown in FIG. 8, such as an operating system (e.g., Linux) that runs on CPU 802 and provides control of various components within and/or connected to computer system 800.

Memory 804, storage unit 812, and/or one or more other computer data storage units (not shown) that are coupled to computer system 800 may store context/state array 211 (see FIG. 2), payload buffer 408 (see FIG. 4), and context/state array 605 (see FIGS. 6A-6F).

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1, system 200 in FIG. 2, or computer system 800). Furthermore, an embodiment of the present invention may take the form of a computer program product embodied in one or more computer readable medium(s) (e.g., memory 804 or computer data storage unit 812) having computer readable program code (e.g., program code 814) embodied or stored thereon.

Any combination of one or more computer readable medium(s) (e.g., memory 804 and computer data storage unit 812) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code (e.g., program code 814) embodied on a computer readable medium may be transmitted using any appropriate medium, including but not limited to wireless, wireline, optical fiber cable, RF, etc., or any suitable combination of the foregoing.

Computer program code (e.g., program code 814) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server, where the aforementioned user's computer, remote computer and server may be, for example, computer system 800 or another computer system (not shown) having components analogous to the components of computer system 800 included in FIG. 8. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 3, 5A, and 5B) and/or block diagrams of methods, apparatus (systems) (e.g., FIGS. 1, 2, 4, 6A-6F and 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 814). These computer program instructions may be provided to a processor (e.g., CPU 802) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium (e.g., memory 804 or computer data storage unit 812) that can direct a computer (e.g., computer system 800), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 800), other programmable data processing apparatus, or other devices to cause a series of operational steps to be performed on the computer, other programmable apparatus, or other devices to produce a computer implemented process such that the instructions which execute on the computer, other programmable apparatus, or other devices provide processes for implementing the functions/acts specified in the flowchart and/or block diagram block or blocks.

In an alternate embodiment, computer system 800 does not include program 814, but further comprises a processor coupled to a computer-readable storage medium that includes array 211 (see FIG. 2). The processor includes one or more logic circuits that include one or more blocks of combinational logic that when executed by the processor implement the processing of data by a pipeline of a VMI FSM, where the processing is included in the method of FIG. 3, FIG. 5A or FIG. 5B, or a combination thereof.

In another alternate embodiment, computer system 800 does not include program 814, but further includes a logic circuit that includes multiple interconnected electrically conductive elements that provide combinational logic that when executed by the logic circuit implement the method of FIG. 3, FIG. 5A, or FIG. 5B, or a combination thereof.

Any of the components of an embodiment of the present invention can be deployed, managed, serviced, etc. by a service provider that offers to deploy or integrate computing infrastructure with respect to the processing by pipelined virtual multiple instance finite state machines. Thus, an embodiment of the present invention discloses a process for supporting computer infrastructure, comprising integrating, hosting, maintaining and deploying computer-readable code (e.g., program code 814) into a computer system (e.g., computer system 800), wherein the code in combination with the computer system is capable of performing processing by pipelined virtual multiple instance finite state machines.

In another embodiment, the invention provides a business method that performs the process steps of the invention on a subscription, advertising and/or fee basis. That is, a service provider, such as a Solution Integrator, can offer to create, maintain, support, etc. processing by pipelined virtual multiple instance finite state machines. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 3, 5A and 5B and the block diagrams in FIGS. 1, 2, 4, 6A-6F and 8 illustrate the architecture, functionality, and operation of possible implementations of systems, methods, and computer program products according to various embodiments of the present invention. In this regard, each block in the flowchart or block diagrams may represent a module, segment, or portion of code (e.g., program code 814), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A logic circuit-implemented method of processing data by a pipeline of a virtual multiple instance finite state machine (VMI FSM), said method comprising:

receiving a plurality of input tokens referencing a plurality of FSM instances included in said VMI FSM, wherein said VMI FSM is a single hardware implementation;

selecting a first input token of said plurality of input tokens to enter said pipeline of said VMI FSM, wherein said first input token includes a first field that includes a reference to a first set of one or more FSM instances (first FSM instance) of said plurality of FSM instances and a second field that includes a first input value;

receiving said first input token at said pipeline of said VMI FSM;

fetching a current state of said first FSM instance and a context of said first FSM instance from an array based on said reference included in said first field of said first input token;

inserting said current state of said first FSM instance and said context of said first FSM instance into one or more other fields of said first input token;

said VMI FSM switching to said first FSM instance of said plurality of FSM instances included in said VMI FSM by receiving said first input token including said current state of said first FSM instance and said context of said first FSM instance inserted into said one or more other fields of said first input token;

determining a new state of said first FSM instance based on said current state of said first FSM instance, said context of said first FSM instance, said first input value, and a status of an environment;

generating a first output token based on said current state of said first FSM instance, said context of said first FSM instance, said first input value, and said status of said environment;

writing said new state and said context of said first FSM instance to said array; and subsequent to said pipeline of said VMI FSM receiving said first input token and prior to said determining said new state and said determining said first output token, selecting a second input token of said plurality of input tokens to enter said pipeline of said VMI FSM, wherein said second input token includes a first field that includes a reference to a second set of one or more FSM instances (second FSM instance) of said plurality of FSM instances and a second field that includes a second input value.

2. The method of claim 1, further comprising pipelining said first input token and said second input token in said pipeline of said VMI FSM.

3. The method of claim 1, further comprising:
subsequent to said selecting said second input token, selecting a third input token of said plurality of input tokens to enter said pipeline of said VMI FSM; and
pipelining said first input token, said second input token and said third input token.

4. The method of claim 1, further comprising:
receiving said second input token at said pipeline of said VMI FSM;
fetching a current state of said second FSM instance and a context of said second FSM instance from said array based on said reference included in said first field of said second input token;
inserting said current state of said second FSM instance and said context of said second FSM instance into one or more other fields of said second input token;
said VMI FSM switching to said second FSM instance of said plurality of FSM instances included in said VMI FSM by receiving said current state of said second FSM instance and said context of said second FSM instance in said one or more other fields of said second input token;
determining a new state of said second FSM instance based on said current state of said second FSM instance, said context of said second FSM instance, said second input value, and a second status of said environment;
generating a second output token based on said current state of said second FSM instance, said context of said second FSM instance, said second input value, and said second status of said environment; and
writing said new state of said second FSM instance to said array.

5. The method of claim 1, further comprising said VMI FSM processing said plurality of input tokens by using only one instance of logic executed by a single hardware FSM implementation and by using said array without using a plurality of current state registers.

6. The method of claim 1, wherein said receiving said plurality of input tokens includes receiving a third input token of said plurality of input tokens, wherein said third input token includes a first field that includes a reference to said first FSM instance and a second field that includes a third input value, and wherein said method further comprises:
subsequent to said receiving said first input token at said pipeline, determining said reference to said first FSM instance in said first field of said third input token is identical to said reference to said first FSM instance in said first field of said first input token and determining said first input token is in said pipeline;
in response to said determining said reference to said first FSM instance in said first field of said third input token is identical to said reference to said first FSM instance in said first field of said first input token and said determining said first input token is in said pipeline, a guard component preventing said third input token from being received at said pipeline while said first input token is in said pipeline;
subsequent to said writing said new state of said first FSM instance, determining said first input token is out of said pipeline;
in response to determining said first input token is out of said pipeline, said guard component allowing said third input token to be received at said pipeline; and
receiving said third input token at said pipeline.

7. The method of claim 1, further comprising processing, by said VMI FSM, a packet header token using an input/output (I/O) protocol on an adapter specified by an InfiniBand architecture, wherein said processing said packet header token includes:
a port receiving a data packet that includes a payload and a packet header;
storing said payload in a payload buffer;
inserting said packet header in a second field of said packet header token, wherein said packet header token is said first input token, and wherein said second field of said packet header token is said second field of said first input token;
extracting a queue pair (QP) number from said packet header, wherein said QP number identifies a QP that specifies a network connection in said InfiniBand architecture;
storing said QP number in a first field of said packet header token, wherein said first field of said packet header token is said first field of said first input token,
wherein said receiving said first input token includes receiving said packet header token from said port and at said VMI FSM.

8. The method of claim 7, further comprising:
determining a transport mode of said network connection specified by said QP is a reliable connect transport mode (RC) or a reliable datagram transport mode (RD);

determining a packet sequence number (PSN) included in said packet header token is equal to an expected PSN (ePSN) included in said fetched context; and in response to said determining said transport mode of said QP is said RC or said RD and in response to said determining said PSN is equal to said ePSN, sending an acknowledgment to said port.

9. The method of claim 1, further comprising processing, by said VMI FSM, a mode change token using an input/output (I/O) protocol on an adapter specified by an InfiniBand architecture, wherein said processing said mode change token includes:

receiving said mode change token;

identifying a queue pair (QP) number in said mode change token, wherein said QP number identifies a QP that specifies a network connection in said InfiniBand architecture; and updating said context by changing a transport protocol of said QP.

10. A logic circuit of multiple interconnected electrically conductive elements configured to perform a method of processing data by a pipeline of a virtual multiple instance finite state machine (VMI FSM), said method comprising:

receiving a plurality of input tokens referencing a plurality of FSM instances included in said VMI FSM, wherein said VMI FSM is a single hardware implementation;

selecting a first input token of said plurality of input tokens to enter said pipeline of said VMI FSM, wherein said first input token includes a first field that includes a reference to a first set of one or more FSM instances (first FSM instance) of said plurality of FSM instances and a second field that includes a first input value;

receiving said first input token at said pipeline of said VMI FSM;

fetching a current state of said first FSM instance and a context of said first FSM instance from an array based on said reference included in said first field of said first input token;

inserting said current state of said first FSM instance and said context of said first FSM instance into one or more other fields of said first input token;

said VMI FSM switching to said first FSM instance of said plurality of FSM instances included in said VMI FSM by receiving said first input token including said current state of said first FSM instance and said context of said first FSM instance inserted into said one or more other fields of said first input token;

determining a new state of said first FSM instance based on said current state of said first FSM instance, said context of said first FSM instance, said first input value, and a status of an environment;

generating a first output token based on said current state of said first FSM instance, said context of said first FSM instance, said first input value, and said status of said environment;

writing said new state and said context of said first FSM instance to said array; and subsequent to said pipeline of said VMI FSM receiving said first input token and prior to said determining said new state and said determining said first output token, selecting a second input token of said plurality of input tokens to enter said pipeline of said VMI FSM, wherein said second input token includes a first field that includes a reference to a second set of one or more FSM instances (second FSM instance) of said plurality of FSM instances and a second field that includes a second input value.

11. The logic circuit of claim 10, wherein said method further comprises pipelining said first input token and said second input token in said pipeline of said VMI FSM.

12. The logic circuit of claim 10, wherein said method further comprises:

subsequent to said selecting said second input token, selecting a third input token of said plurality of input tokens to enter said pipeline of said VMI FSM; and pipelining said first input token, said second input token and said third input token.

13. The logic circuit of claim 10, wherein said method further comprises:

receiving said second input token at said pipeline of said VMI FSM;

fetching a current state of said second FSM instance and a context of said second FSM instance from said array based on said reference included in said first field of said second input token;

inserting said current state of said second FSM instance and said context of said second FSM instance into one or more other fields of said second input token;

said VMI FSM switching to said second FSM instance of said plurality of FSM instances included in said VMI FSM by receiving said current state of said second FSM instance and said context of said second FSM instance in said one or more other fields of said second input token;

determining a new state of said second FSM instance based on said current state of said second FSM instance, said context of said second FSM instance, said second input value, and a second status of said environment;

generating a second output token based on said current state of said second FSM instance, said context of said second FSM instance, said second input value, and said second status of said environment; and writing said new state of said second FSM instance to said array.

14. The logic circuit of claim 10, wherein said method further comprises said VMI FSM processing said plurality of input tokens by using only one instance of logic executed by a single hardware FSM implementation and by using said array without using a plurality of current state registers.

15. The logic circuit of claim 10, wherein said receiving said plurality of input tokens includes receiving a third input token of said plurality of input tokens, wherein said third input token includes a first field that includes a reference to said first FSM instance and a second field that includes a third input value, and wherein said method further comprises:

subsequent to said receiving said first input token at said pipeline, determining said reference to said first FSM instance in said first field of said third input token is identical to said reference to said first FSM instance in said first field of said first input token and determining said first input token is in said pipeline;

in response to said determining said reference to said first FSM instance in said first field of said third input token is identical to said reference to said first FSM instance in said first field of said first input token and said determining said first input token is in said pipeline, a guard component preventing said third input token from being received at said pipeline while said first input token is in said pipeline;

subsequent to said writing said new state of said first FSM instance, determining said first input token is out of said pipeline;

in response to determining said first input token is out of said pipeline, said guard component allowing said third input token to be received at said pipeline; and receiving said third input token at said pipeline.

16. The logic circuit of claim 10, wherein said method further comprises processing, by said VMI FSM, a packet header token using an input/output (I/O) protocol on an adapter specified by an InfiniBand architecture, wherein said processing said packet header token includes:

a port receiving a data packet that includes a payload and a packet header;

storing said payload in a payload buffer;

inserting said packet header in a second field of said packet header token, wherein said packet header token is said first input token, and wherein said second field of said packet header token is said second field of said first input token;

extracting a queue pair (QP) number from said packet header, wherein said QP number identifies a QP that specifies a network connection in said InfiniBand architecture;

storing said QP number in a first field of said packet header token, wherein said first field of said packet header token is said first field of said first input token, wherein said receiving said first input token includes receiving said packet header token from said port and at said VMI FSM.

17. The logic circuit of claim 16, wherein said method further comprises:

determining a transport mode of said network connection specified by said QP is a reliable connect transport mode (RC) or a reliable datagram transport mode (RD);

determining a packet sequence number (PSN) included in said packet header token is equal to an expected PSN (ePSN) included in said fetched context; and in response to said determining said transport mode of said QP is said RC or said RD and in response to said determining said PSN is equal to said ePSN, sending an acknowledgment to said port.

18. The logic circuit of claim 10, wherein said method further comprises processing, by said VMI FSM, a mode change token using an input/output (I/O) protocol on an adapter specified by an InfiniBand architecture, wherein said processing said mode change token includes:

receiving said mode change token;

identifying a queue pair (QP) number in said mode change token, wherein said QP number identifies a QP that specifies a network connection in said InfiniBand architecture; and updating said context by changing a transport protocol of said QP.

19. A computer system comprising a processor that includes the logic circuit of claim 10.

20. A computer system comprising:

a processor; and a computer-readable storage medium coupled to said processor, wherein said processor includes one or more logic circuits including combinational logic that when executed by said processor implement a method of processing data by a pipeline of a virtual multiple instance finite state machine (VMI FSM), said method comprising:

receiving a plurality of input tokens referencing a plurality of FSM instances included in said VMI FSM, wherein said VMI FSM is a single hardware implementation;

selecting a first input token of said plurality of input tokens to enter said pipeline of said VMI FSM, wherein said first input token includes a first field that includes a reference to a first set of one or more FSM instances (first FSM instance) of said plurality of FSM instances and a second field that includes a first input value;

receiving said first input token at said pipeline of said VMI FSM;

fetching a current state of said first FSM instance and a context of said first FSM instance from an array based on said reference included in said first field of said first input token;

inserting said current state of said first FSM instance and said context of said first FSM instance into one or more other fields of said first input token;

said VMI FSM switching to said first FSM instance of said plurality of FSM instances included in said VMI FSM by receiving said first input token including said current state of said first FSM instance and said context of said first FSM instance inserted into said one or more other fields of said first input token;

determining a new state of said first FSM instance based on said current state of said first FSM instance, said context of said first FSM instance, said first input value, and a status of an environment;

generating a first output token based on said current state of said first FSM instance, said context of said first FSM instance, said first input value, and said status of said environment;

writing said new state and said context of said first FSM instance to said array; and subsequent to said pipeline of said VMI FSM receiving said first input token and prior to said determining said new state and said determining said first output token, selecting a second input token of said plurality of input tokens to enter said pipeline of said VMI FSM, wherein said second input token includes a first field that includes a reference to a second set of one or more FSM instances (second FSM instance) of said plurality of FSM instances and a second field that includes a second input value.

* * * * *